(12) United States Patent
Schwie et al.

(10) Patent No.: US 10,466,057 B1
(45) Date of Patent: Nov. 5, 2019

(54) SELF-DRIVING VEHICLE SYSTEMS AND METHODS

(71) Applicants: Wesley Edward Schwie, Minneapolis, MN (US); Eric John Wengreen, Sammamish, WA (US)

(72) Inventors: Wesley Edward Schwie, Minneapolis, MN (US); Eric John Wengreen, Sammamish, WA (US)

(*) Notice: Subject to any disclaimer, the term of this patent is extended or adjusted under 35 U.S.C. 154(b) by 0 days.

(21) Appl. No.: 16/148,861

(22) Filed: Oct. 1, 2018

Related U.S. Application Data

(63) Continuation-in-part of application No. 16/049,275, filed on Jul. 30, 2018.

(51) Int. Cl.
| | |
|---|---|
| *G01C 21/34* | (2006.01) |
| *G05D 1/00* | (2006.01) |
| *G08G 1/0967* | (2006.01) |
| *G05D 1/02* | (2006.01) |
| *G06N 20/00* | (2019.01) |

(52) U.S. Cl.
CPC ..... *G01C 21/3438* (2013.01); *G01C 21/3492* (2013.01); *G05D 1/0088* (2013.01); *G05D 1/0221* (2013.01); *G06N 20/00* (2019.01); *G08G 1/096725* (2013.01); *G05D 2201/0213* (2013.01)

(58) Field of Classification Search
CPC ............ G01C 21/3438; G01C 21/3492; G06N 20/00; G05D 1/0088; G05D 1/0221; G05D 2201/0213; G08G 1/096725
See application file for complete search history.

(56) References Cited

U.S. PATENT DOCUMENTS

| | | | |
|---|---|---|---|
| 4,212,069 A | 7/1980 | Baumann | |
| 5,798,695 A | 8/1998 | Metalis | |
| 5,945,919 A | 8/1999 | Trask | |
| 6,011,478 A | 1/2000 | Suzuki | |
| 7,413,357 B2 | 8/2008 | Badalian | |
| 7,698,078 B2 | 4/2010 | Kelty | |
| 7,777,619 B2 | 8/2010 | Yopp | |
| 8,055,534 B2* | 11/2011 | Ashby | G06Q 30/02 340/425.5 |
| 8,078,359 B2 | 12/2011 | Small | |
| 8,150,611 B2* | 4/2012 | Mukherjee | G08G 1/0104 701/117 |

(Continued)

OTHER PUBLICATIONS

Zach Epstein, You'll be riding in self-driving cars as soon as next year, May 6, 2016, BGR.com, http://bgr.com/2016105'06/lyfl-self-driving-cars-2017/, pp. 1-5.

(Continued)

*Primary Examiner* — Behrang Badii
*Assistant Examiner* — Daniel L Greene

(57) ABSTRACT

Self-driving vehicles have unlimited potential to learn and predict human behavior and perform actions accordingly. Several embodiments described herein include a method of using a vehicle management system to determine high traffic areas and thereby move a self-driving vehicle to a variety of pick-up locations to meet a rider. Methods also include receiving, by the vehicle management system, a primary pick-up location to meet the rider. Additionally, methods include determining, by the vehicle management system, whether traffic adjacent to the primary pick-up location is greater than a predetermined traffic threshold.

29 Claims, 21 Drawing Sheets

(56) References Cited

U.S. PATENT DOCUMENTS

| | | | |
|---|---|---|---|
| 8,180,379 B2 | 5/2012 | Forstall | |
| 8,285,571 B2* | 10/2012 | Demirdjian | G01S 13/825 |
| | | | 705/319 |
| 8,325,025 B2 | 12/2012 | Morgan | |
| 8,433,934 B1 | 4/2013 | On | |
| 8,452,771 B2* | 5/2013 | Kurciska | G08G 1/0112 |
| | | | 707/737 |
| 8,634,980 B1 | 1/2014 | Urmson | |
| 8,700,251 B1 | 4/2014 | Zhu | |
| 8,849,494 B1 | 9/2014 | Herbach | |
| 8,874,305 B2 | 10/2014 | Dolgov | |
| 8,949,016 B1 | 2/2015 | Ferguson | |
| 8,954,217 B1 | 2/2015 | Montemerlo | |
| 8,954,252 B1 | 2/2015 | Urmson | |
| 8,965,621 B1 | 2/2015 | Urmson | |
| 8,996,224 B1 | 3/2015 | Herbach | |
| 9,008,890 B1 | 4/2015 | Herbach | |
| 9,019,107 B2 | 4/2015 | Biondo | |
| 9,026,300 B2 | 5/2015 | Ferguson | |
| 9,119,038 B2 | 8/2015 | Woods | |
| 9,120,484 B1 | 9/2015 | Ferguson | |
| 9,120,485 B1 | 9/2015 | Dolgov | |
| 9,139,133 B2 | 9/2015 | Eng | |
| 9,194,168 B1 | 11/2015 | Lu | |
| 9,262,914 B2 | 2/2016 | Purushothaman | |
| 9,290,174 B1 | 3/2016 | Zagorski | |
| 9,429,947 B1 | 8/2016 | Wengreen | |
| 9,459,622 B2 | 10/2016 | Abhyanker | |
| 9,514,623 B1 | 12/2016 | Urrutia | |
| 9,527,217 B1 | 12/2016 | Lowy | |
| 9,646,356 B1 | 5/2017 | Schwie | |
| 9,685,058 B2 | 6/2017 | Schmidt | |
| 9,733,096 B2 | 8/2017 | Colijn | |
| 9,894,484 B1* | 2/2018 | Pao | H04W 4/023 |
| 9,915,949 B2 | 3/2018 | Schwie | |
| 10,036,642 B2 | 7/2018 | Ross | |
| 10,050,760 B2 | 8/2018 | Ross | |
| 2002/0121291 A1 | 9/2002 | Daum | |
| 2003/0195696 A1 | 10/2003 | Jones | |
| 2007/0198144 A1 | 8/2007 | Norris | |
| 2008/0195428 A1* | 8/2008 | O'Sullivan | G06Q 10/00 |
| | | | 705/6 |
| 2009/0140886 A1 | 6/2009 | Bender | |
| 2009/0287367 A1 | 11/2009 | Salinger | |
| 2011/0098017 A1 | 4/2011 | Berry | |
| 2012/0009845 A1 | 1/2012 | Schmelzer | |
| 2012/0083960 A1 | 4/2012 | Zhu | |
| 2012/0290950 A1* | 11/2012 | Rapaport | H04L 51/32 |
| | | | 715/753 |
| 2013/0085817 A1 | 4/2013 | Pinkus | |
| 2013/0132140 A1 | 5/2013 | Amin | |
| 2013/0197674 A1 | 8/2013 | Lowry | |
| 2013/0231824 A1 | 9/2013 | Wilson | |
| 2013/0246301 A1 | 9/2013 | Radhakrishnan | |
| 2014/0129951 A1 | 5/2014 | Amin | |
| 2014/0172727 A1 | 6/2014 | Abhyanker | |
| 2014/0316616 A1 | 10/2014 | Kugelmass | |
| 2014/0336935 A1 | 11/2014 | Zhu | |
| 2014/0350855 A1 | 11/2014 | Vishnuvajhala | |
| 2015/0012833 A1 | 1/2015 | Foy | |
| 2015/0046080 A1 | 2/2015 | Wesselius | |
| 2015/0066284 A1 | 3/2015 | Yopp | |
| 2015/0088421 A1 | 3/2015 | Foster | |
| 2015/0120504 A1 | 4/2015 | Todasco | |
| 2015/0148077 A1 | 5/2015 | Jelle | |
| 2015/0149283 A1 | 5/2015 | Horstemeyer | |
| 2015/0185034 A1 | 7/2015 | Abhyanker | |
| 2015/0199619 A1 | 7/2015 | Ichinose | |
| 2015/0248689 A1 | 9/2015 | Paul | |
| 2015/0271290 A1 | 9/2015 | Tao | |
| 2015/0295949 A1 | 10/2015 | Chizeck | |
| 2015/0339928 A1 | 11/2015 | Ramanujam | |
| 2015/0346727 A1 | 12/2015 | Ramanujam | |
| 2015/0348221 A1 | 12/2015 | Pedersen | |
| 2016/0027307 A1 | 1/2016 | Abhyanker | |
| 2016/0034828 A1 | 2/2016 | Sarawgi | |
| 2016/0034845 A1 | 2/2016 | Hiyama | |
| 2016/0071056 A1 | 3/2016 | Ellison | |
| 2016/0092976 A1 | 3/2016 | Marusyk | |
| 2016/0116293 A1 | 4/2016 | Grover | |
| 2016/0125735 A1 | 5/2016 | Tuukkanen | |
| 2016/0187150 A1 | 6/2016 | Sherman | |
| 2016/0209220 A1 | 7/2016 | Laetz | |
| 2016/0209843 A1 | 7/2016 | Meuleau | |
| 2016/0227193 A1 | 8/2016 | Osterwood | |
| 2016/0247095 A1 | 8/2016 | Scicluna | |
| 2016/0247106 A1 | 8/2016 | Dalloro | |
| 2016/0247247 A1* | 8/2016 | Scicluna | G06Q 10/02 |
| 2016/0264021 A1 | 9/2016 | Gillett | |
| 2016/0277560 A1 | 9/2016 | Gruberman | |
| 2016/0301698 A1* | 10/2016 | Katara | G07B 13/02 |
| 2016/0342934 A1 | 11/2016 | Michalik | |
| 2016/0364678 A1* | 12/2016 | Cao | G06Q 50/30 |
| 2016/0364812 A1 | 12/2016 | Cao | |
| 2016/0364823 A1 | 12/2016 | Coa | |
| 2016/0370194 A1 | 12/2016 | Colijn | |
| 2017/0024393 A1 | 1/2017 | Choksi | |
| 2017/0050321 A1 | 2/2017 | Look | |
| 2017/0068245 A1 | 3/2017 | Scofield | |
| 2017/0075358 A1 | 3/2017 | Zhang | |
| 2017/0089715 A1 | 3/2017 | Guo | |
| 2017/0103490 A1 | 4/2017 | Haparnas | |
| 2017/0132540 A1 | 5/2017 | Haparnas | |
| 2017/0147951 A1 | 5/2017 | Meyer | |
| 2017/0147959 A1 | 5/2017 | Sweeney | |
| 2017/0169535 A1* | 6/2017 | Tolkin | G06Q 10/06311 |
| 2017/0248949 A1 | 8/2017 | Moran | |
| 2017/0277191 A1 | 9/2017 | Fairfield | |
| 2017/0300053 A1 | 10/2017 | Wengreen | |
| 2017/0316621 A1 | 11/2017 | Jefferies | |
| 2017/0344010 A1* | 11/2017 | Rander | G06Q 50/28 |
| 2017/0363430 A1 | 12/2017 | Al-Dahle | |
| 2018/0130161 A1 | 5/2018 | Wengreen | |
| 2018/0211541 A1* | 7/2018 | Rakah | G08G 1/096844 |

OTHER PUBLICATIONS

Ramsey et al., GM, Lyft to Test Self-Driving Electric Taxis, May 5, 2016, The Wall Street Journal, http://www.wsj.com/articles/gm-lyft-to-test-self-driving-electric-taxis-1462460094, pp. 1-4.

Google Self-Driving Vehicle—Online prior to Apr. 13, 2016 at www.google.com/selfdrivingcar/, 17 pages.

Testa Autopilot—Online prior to Apr. 13, 2016 at www.technologyreview.com/s/600772/10-breakthrough- technologies-2016-tesla-autopilot/, 4 pages.

Testa Model S Software Version 7—Autopilot—Online prior to Apr. 13, 2016 at www.teslamotors.com/presskit/autopilot, 3 pages.

BMW Heads Up Display—Online prior to Apr. 13, 2016 at www.autotrader.com/car-news/full-color-heads-up-display-to-debut-on-new-3-series-132586, 5 pages.

Uber Details—Online prior to Apr. 13, 2016 at www.wikihow.com/Use-Uber, 17 pages.

Raspberry Pi: How can I detect the direction of a sound—Online prior to Apr. 13, 2016 at www.quora.com/Raspberry-Pi-1/How-can-I-detect-the-direction-of-a-sound, 3 pages.

Wikipedia: Biometric Device—Downloaded on Aug. 19, 2016 from en.wikipedia.org/wiki/Biometric_device, 5 pages.

Self-Driving Cars Go Public; Uber Offers Rides in Pittsburgh—Downloaded on Aug. 19, 2016 from www.yahoo.com/news/uber-autonomous-cars-haul-people-125127470.html?ref=gs, 3 pages.

Mark Harris, Uber Could Be First to Test Completely Driverless Cars in Public, Sep. 14, 2015, IEEE Spectrum, http://spectrum.ieee.org/cars-that-think/transportation/self-driving/uber-could-be-first-to-test-completely-driverless-cars-in-public, 3 pages.

Zach Epstein, You'll be riding in self-driving cars as soon as next year, May 6, 2016, BGR.com, http://bgr.com/2016105'06/lyfl-self-driving-cars-2017/, pp. 1-5, 5 pages.

Ramsey et al., GM, Lyft to Test Self-Driving Electric Taxis, May 5, 2016, The Wall Street Journal, http://www.wsj.com/articles/gm-lyft-to-test-self-driving-electric-taxis-1462460094, pp. 1-4, 4 pages.

(56) References Cited

OTHER PUBLICATIONS

Explain That Stuff: Smoke Detectors—Downloaded on Sep. 28, 2018 from www.explainthatstuff.com/smokedetector.html, 10 pages.
Nittan: EV-DP Smoke Detector—Downloaded on Sep. 28, 2018 from nittan.co.uk/products/products/ev/ev-dp, 2 pages.
Wikipedia: Rain Sensor—Downloaded on Sep. 28, 2018 from en.wikipedia.org/wiki/Rain_sensor, 2 pages.
Nest: Split-Spectrum White Paper—Downloaded on Oct. 1, 2018 from nest.com/support/images/misc-assets/Split-Spectrum-Sensor-White-Paper.pdf, 17 pages.
How Police Visually Detect Drunk Drivers—Downloaded on Oct. 19, 2018 from thelaw.com/law/how-police-visually-detect-drunk-drivers.185, 7 pages.
Velodyne VLS-128 LiDAR Sensor—Downloaded on Oct. 22, 2018 from velodynelidar.com/vls-128.html, 4 pages.
Waymo's Suite of Custom-Built, Self-Driving Hardware—Downloaded on Oct. 22, 2018 from medium.com/waymo/introducing-waymos-suite-of-custom-built-self-driving-hardware-c47d1714563, 7 pages.
Lidar—Downloaded on Oct. 24, 2018 from en.wikipedia.org/wiki/Lidar, 26 pages.
Radar—Downloaded on Oct. 24, 2018 from en.wikipedia.org/wiki/Radar, 25 pages.

* cited by examiner

SELF-DRIVING VEHICLE SYSTEMS AND METHODS

CROSS-REFERENCE TO RELATED APPLICATIONS

The entire contents of the following application are incorporated by reference herein: U.S. patent application Ser. No. 16/134,190; filed Sep. 18, 2018; and entitled SELF-DRIVING VEHICLE SYSTEMS AND METHODS.

The entire contents of the following application are incorporated by reference herein: U.S. patent application Ser. No. 16/128,334; filed Sep. 11, 2018; and entitled SELF-DRIVING VEHICLE SYSTEMS AND METHODS.

The entire contents of the following application are incorporated by reference herein: U.S. patent application Ser. No. 15/863,903; filed Jan. 8, 2018; and entitled SELF-DRIVING VEHICLE SYSTEMS AND METHODS.

The entire contents of the following application are incorporated by reference herein: U.S. patent application Ser. No. 16/049,275; filed Jul. 30, 2018; and entitled SELF-DRIVING VEHICLE SYSTEMS AND METHODS.

The entire contents of the following application are incorporated by reference herein: U.S. patent application Ser. No. 15/181,413; filed Jun. 14, 2016; and entitled SELF-DRIVING VEHICLE SYSTEMS AND METHODS.

The entire contents of the following application are incorporated by reference herein: U.S. patent application Ser. No. 15/099,565; filed Apr. 14, 2016; and entitled SELF-DRIVING VEHICLE SYSTEMS AND METHODS.

The entire contents of the following application are incorporated by reference herein: U.S. patent application Ser. No. 15/248,910; filed Aug. 26, 2016; and entitled SELF-DRIVING VEHICLE SYSTEMS AND METHODS.

The entire contents of the following application are incorporated by reference herein: U.S. patent application Ser. No. 15/589,619; filed May 8, 2017; and entitled SELF-DRIVING VEHICLE SYSTEMS AND METHODS.

BACKGROUND

Field

Various embodiments disclosed herein relate to vehicles. Certain embodiments relate to self-driving motorized vehicles.

Description of Related Art

Vehicles typically require a driver. These vehicles often can only perform actions when directly instructed by the driver. However, self-driving vehicles are not reliant upon drivers and can perform actions based upon external events. As such, self-driving vehicles can save time and dramatically increase convenience in roadway travel. As a result, there is a need for systems and methods that enable self-driving vehicles to perform actions based upon external events.

SUMMARY

Self-driving vehicles will save tens of thousands of lives per year. The majority of vehicle-related deaths are caused by driver error. Tests have shown that self-driving vehicles nearly eliminate self-inflicted accidents (although they are not immune to accidents caused by human drivers of other vehicles). Self-driving vehicles have unlimited attention spans and can process complex sensor data nearly instantaneously. The ability of self-driving vehicles to save lives is so impressive that society has a moral imperative to develop self-driving technology such that it can be widely adopted.

Self-driving vehicles also have the ability to dramatically save time and improve convenience in roadway travel. Specifically, self-driving vehicles have unlimited potential to learn and predict human behavior and perform actions accordingly. Many embodiments described herein enable a self-driving vehicle to monitor human activity and predict when and where the human will be located and whether the human needs a ride from the self-driving vehicle. Self-driving vehicles will be able to perform such tasks with incredible efficacy and accuracy that will allow self-driving vehicles to proliferate at a much faster rate than would otherwise be the case.

The disclosure includes a method of using a vehicle management system to determine high traffic areas and thereby move a self-driving vehicle to a variety of pick-up locations to meet a rider, wherein the vehicle management system is configured to be communicatively coupled with a remote computing device associated with a rider. Methods may include receiving, by the vehicle management system, a primary pick-up location to meet the rider; and determining, by the vehicle management system, whether traffic adjacent to the primary pick-up location is greater than a predetermined traffic threshold.

In response to determining that the traffic adjacent to the primary pick-up location is not greater than the predetermined traffic threshold, methods may further include sending, by the vehicle management system, the self-driving vehicle to the primary pick-up location. Determining whether traffic adjacent to the primary pick-up location is greater than a predetermined traffic threshold may comprise determining that at least one of a following conditions exist: a number of remote computing device hot spots adjacent the primary pick-up location exceeds a predetermined hot spot threshold; traffic data collected via wireless communications indicates that traffic adjacent the primary pick-up location exceeds a predetermined traffic data threshold; a number of social media check-ins adjacent the primary pick-up location exceeds a predetermined social media check-in threshold; a number of remote computing devices adjacent the primary pick-up location exceeds a predetermined remote computing device threshold; a number of Bluetooth signals adjacent the primary pick-up location exceeds a predetermined Bluetooth threshold; and a number of Wi-Fi signals adjacent the primary pick-up location exceeds a predetermined Wi-Fi threshold.

Furthermore, in response to determining that the traffic adjacent to the primary pick-up location is greater than the predetermined traffic threshold, methods may further include sending, by the vehicle management system, a wireless communication to the remote computing device, wherein the wireless communication is configured to prompt the rider to select an alternate pick-up location. Additionally, in response to determining that the traffic adjacent to the primary pick-up location is greater than the predetermined traffic threshold, methods may further comprise identifying, by the vehicle management system, an alternate pick-up location, and sending, by the vehicle management system, a wireless communication to the remote computing device, wherein the wireless communication comprises a request to meet at the alternate pick-up location.

In some embodiments, the method includes sending, by the vehicle management system, the self-driving vehicle to the alternate pick-up location. Even still, in some embodiments, the method includes receiving, by the vehicle management system, a response wireless communication from the remote computing device, wherein the response wireless communication comprises a confirmation to meet at the alternate pick-up location.

Methods may also include receiving, by the vehicle management system, a response wireless communication from the remote computing device, wherein the response wireless communication comprises a secondary alternate pick-up location. Likewise, methods may include sending, by the vehicle management system, the self-driving vehicle to the secondary alternate pick-up location.

In some embodiments, the method includes at least one of receiving, by the vehicle management system, a response wireless communication from the remote computing device, wherein the response wireless communication comprises a rejection to meet at the alternate pick-up location; and receiving, by the vehicle management system, no response from the remote computing device. In response to at least one of receiving, by the vehicle management system, the response wireless communication from the remote computing device, and receiving, by the vehicle management system, no response from the remote computing device, methods may further include sending, by the vehicle management system, the self-driving vehicle to the primary pick-up location.

Additionally, in some embodiments, the method includes receiving, by the vehicle management system, a predetermined pick-up location to meet the rider selected by the rider as a back-up pick-up location relative to the primary pick-up location. Some embodiments include sending, by the vehicle management system, the self-driving vehicle to the predetermined pick-up location in response to determining, by the vehicle management system, that at least one traffic indication regarding the primary pick-up location is greater than a predetermined threshold. Methods may also include sending, by the vehicle management system, a wireless communication to the remote computing device. The wireless communication may comprise a notification to meet at the predetermined pick-up location. In some embodiments, the method includes receiving, by the vehicle management system, a response wireless communication from the remote computing device, wherein the response wireless communication comprises a confirmation to meet at the predetermined pick-up location. In response to receiving the response wireless communication from the remote computing device, methods may include sending, by the vehicle management system, the self-driving vehicle to the predetermined pick-up location.

The disclosure also includes a method of using a vehicle management system to determine high traffic areas and thereby move a self-driving vehicle to a variety of pick-up locations to meet a rider, wherein the vehicle management system is configured to be communicatively coupled with a remote computing device associated with a rider. Methods may thereby include receiving, by the vehicle management system, a primary pick-up location to meet the rider; and determining, by the vehicle management system, whether traffic adjacent to the primary pick-up location will be greater than a predetermined traffic threshold at a predetermined future time. Determining whether traffic adjacent to the primary pick-up location will be greater than a predetermined traffic threshold at the predetermined future time may comprise determining that at least one of a following conditions exist: a number of remote computing device hot spots adjacent the primary pick-up location exceeds a predetermined hot spot threshold; traffic data collected via wireless communications indicates that traffic adjacent the primary pick-up location exceeds a predetermined traffic data threshold; a number of social media check-ins adjacent the primary pick-up location exceeds a predetermined social media check-in threshold; a number of remote computing devices adjacent the primary pick-up location exceeds a predetermined remote computing device threshold; a number of Bluetooth signals adjacent the primary pick-up location exceeds a predetermined Bluetooth threshold; and a number of Wi-Fi signals adjacent the primary pick-up location exceeds a predetermined Wi-Fi threshold.

In response to determining that the traffic adjacent to the primary pick-up location will be greater than the predetermined traffic threshold, methods may include identifying, by the vehicle management system, an alternate pick-up location, and sending, by the vehicle management system, a wireless communication to the remote computing device. The wireless communication may include a request to meet at the alternate pick-up location.

In some embodiments, the method also includes receiving, by the vehicle management system, a response wireless communication from the remote computing device, wherein the response wireless communication comprises a confirmation to meet at the alternate pick-up location. Accordingly, the method may include sending, by the vehicle management system, the self-driving vehicle to the alternate pick-up location.

Methods may also include receiving, by the vehicle management system, a response wireless communication from the remote computing device. The response wireless communication may include a secondary alternate pick-up location. Such methods may also include sending, by the vehicle management system, the self-driving vehicle to the secondary alternate pick-up location.

In some embodiments, the method includes receiving, by the vehicle management system, a response wireless communication from the remote computing device, wherein the response wireless communication comprises a rejection to meet at the alternate pick-up location. Methods may also include receiving, by the vehicle management system, no response from the remote computing device. Accordingly, in response to at least one of receiving, by the vehicle management system, the response wireless communication from the remote computing device, and receiving, by the vehicle management system, no response from the remote computing device, methods may include sending, by the vehicle management system, the self-driving vehicle to the primary pick-up location.

Even still, in some embodiments, methods include receiving, by the vehicle management system, a predetermined pick-up location to meet the rider selected by the rider as a back-up pick-up location relative to the primary pick-up location; and sending, by the vehicle management system, a wireless communication to the remote computing device. The wireless communication may comprise a notification to meet at the predetermined pick-up location. Methods may also include receiving, by the vehicle management system, a response wireless communication from the remote computing device. The response wireless communication may comprise a confirmation to meet at the predetermined pick-up location. In response to receiving the response wireless communication from the remote computing device, methods may include sending, by the vehicle management system, the self-driving vehicle to the predetermined pick-up location.

The disclosure also includes a method of using a vehicle management system to determine high traffic areas and thereby move a self-driving vehicle to a variety of pick-up locations to meet a rider, wherein the vehicle management system is configured to be communicatively coupled with a remote computing device associated with a rider. Methods may thereby include receiving, by the vehicle management system, a primary pick-up location to meet the rider; and determining, by the vehicle management system, that at least one traffic indication regarding the primary pick-up location is greater than a predetermined threshold.

In response to determining, by the vehicle management system, that the at least one traffic indication regarding the primary pick-up location is greater than the predetermined threshold, methods may further include sending, by the vehicle management system, a wireless communication to the remote computing device. The wireless communication may be configured to prompt the rider to select an alternate pick-up location.

In some embodiments, determining, by the vehicle management system, that the at least one traffic indication regarding the primary pick-up location is greater than the predetermined threshold comprises detecting, by an antenna of the self-driving vehicle, a number of remote computing device hot spots, and then analyzing, by the vehicle management system, the number to determine that the number is greater than a predetermined hot spot threshold. As well, in some embodiments, determining, by the vehicle management system, that the at least one traffic indication regarding the primary pick-up location is greater than the predetermined threshold comprises receiving, by the vehicle management system, traffic data collected via wireless communications, and then determining, by the vehicle management system, that the traffic data indicates that traffic at the primary pick-up location exceeds a predetermined traffic threshold.

Even still, in some embodiments, determining, by the vehicle management system, that the at least one traffic indication regarding the primary pick-up location is greater than the predetermined threshold comprises analyzing, by the vehicle management system a number of social media check-ins adjacent the primary pick-up location, and then determining that the number exceeds a predetermined social media check-in threshold. In some embodiments, determining, by the vehicle management system, that the at least one traffic indication regarding the primary pick-up location is greater than the predetermined threshold comprises detecting, by an antenna of the self-driving vehicle, a number of remote computing devices adjacent the primary pick-up location, and then determining, by the vehicle management system, that the number exceeds a predetermined remote computing device threshold. Additionally, in some embodiments, determining, by the vehicle management system, that the at least one traffic indication regarding the primary pick-up location is greater than the predetermined threshold comprises detecting, by an antenna of the self-driving vehicle, a number of radio communication devices adjacent the primary pick-up location, and then determining, by the vehicle management system, that the number exceeds a predetermined threshold.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Self-driving vehicles will provide significant savings to the economy and society at-large. For example, self-driving vehicles will not only greatly reduce roadway congestion, thus making transportation more efficient and less costly, but self-driving vehicles will also learn and adapt to human behavior, thus providing an unimaginable level of convenience in today's world of transportation. The ability of self-driving vehicles to positively impact the economy and public is so impressive that society has a moral imperative to develop self-driving technology such that it can be widely adopted.

Self-driving vehicles have unlimited potential to learn and predict human behavior and perform actions accordingly. Many embodiments described herein enable a self-driving vehicle to monitor human activity and predict when and where the human will be located and whether the human needs a ride from the self-driving vehicle. Self-driving vehicles will be able to perform such tasks with incredible efficacy and accuracy, which will allow self-driving vehicles to proliferate at a much faster than would otherwise be the case.

Figure 1:
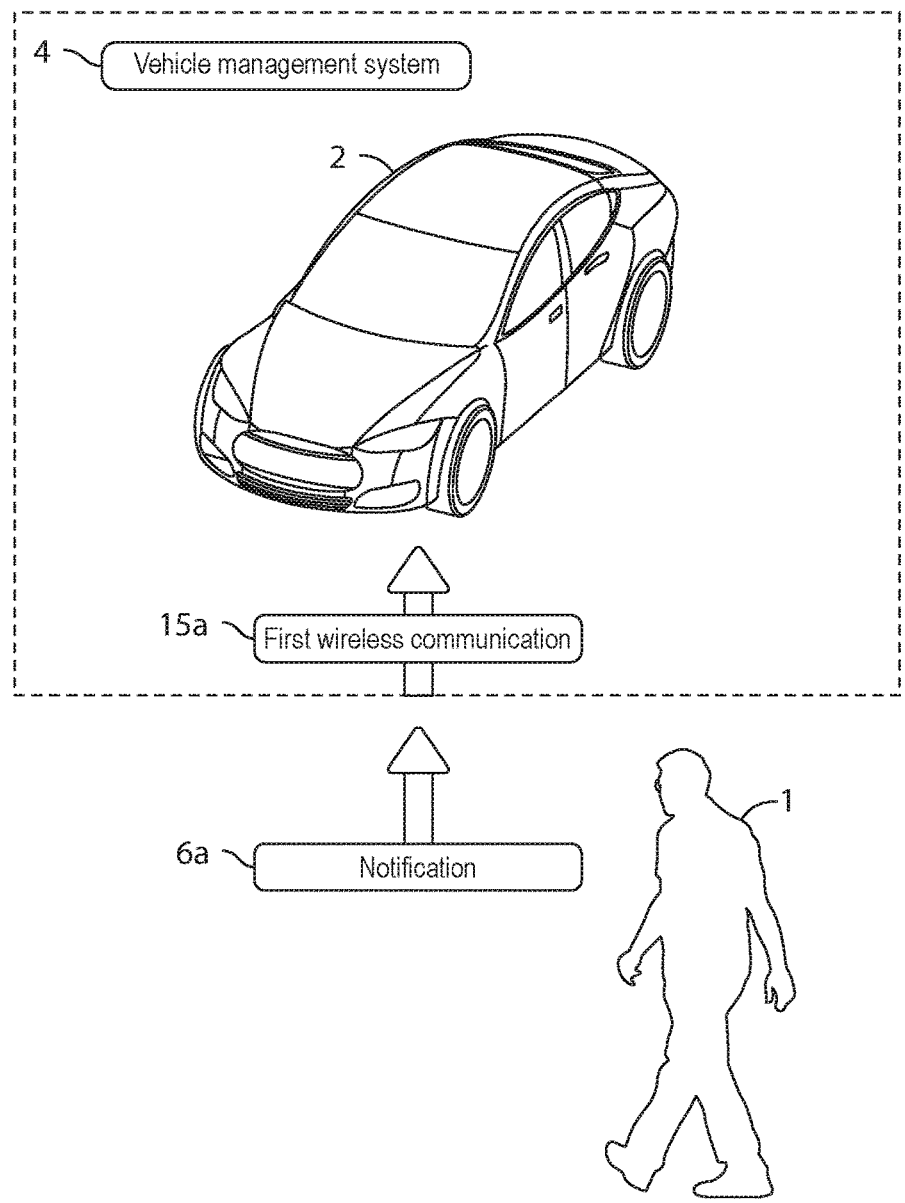
FIG. 1 illustrates a diagrammatic view of a self-driving vehicle, according to some embodiments.

FIG. 1 illustrates a diagrammatic view of a self-driving vehicle 2 ("vehicle") and a vehicle management system 4 ("system"). In some embodiments, the system 4 comprises the vehicle 2. In this regard, the system 4 can comprise a plurality of vehicles (e.g. self-driving vehicles and non self-driving vehicles) that are communicatively coupled to the system 4. In some embodiments, the vehicle 2 comprises the system 4. In this regard, the system 4 can be implemented as an on-board system located within the vehicle 2. In such embodiments, the system 4 can still be communicatively coupled to other vehicles (e.g. self-driving vehicles and non self-driving vehicles).

With continued reference to FIG. 1, the system 4 can receive a notification 6a. In some embodiments, the system 4 can send a first wireless communication 15a to the vehicle 2 in response to the system 4 receiving the notification 6a. The first wireless communication 15a can thereby prompt the vehicle 2 to move towards the person 1. It should be noted that any of the transmission steps described in this disclosure, such as sending, receiving, and the like, can be executed directly and/or indirectly.

Figure 2:
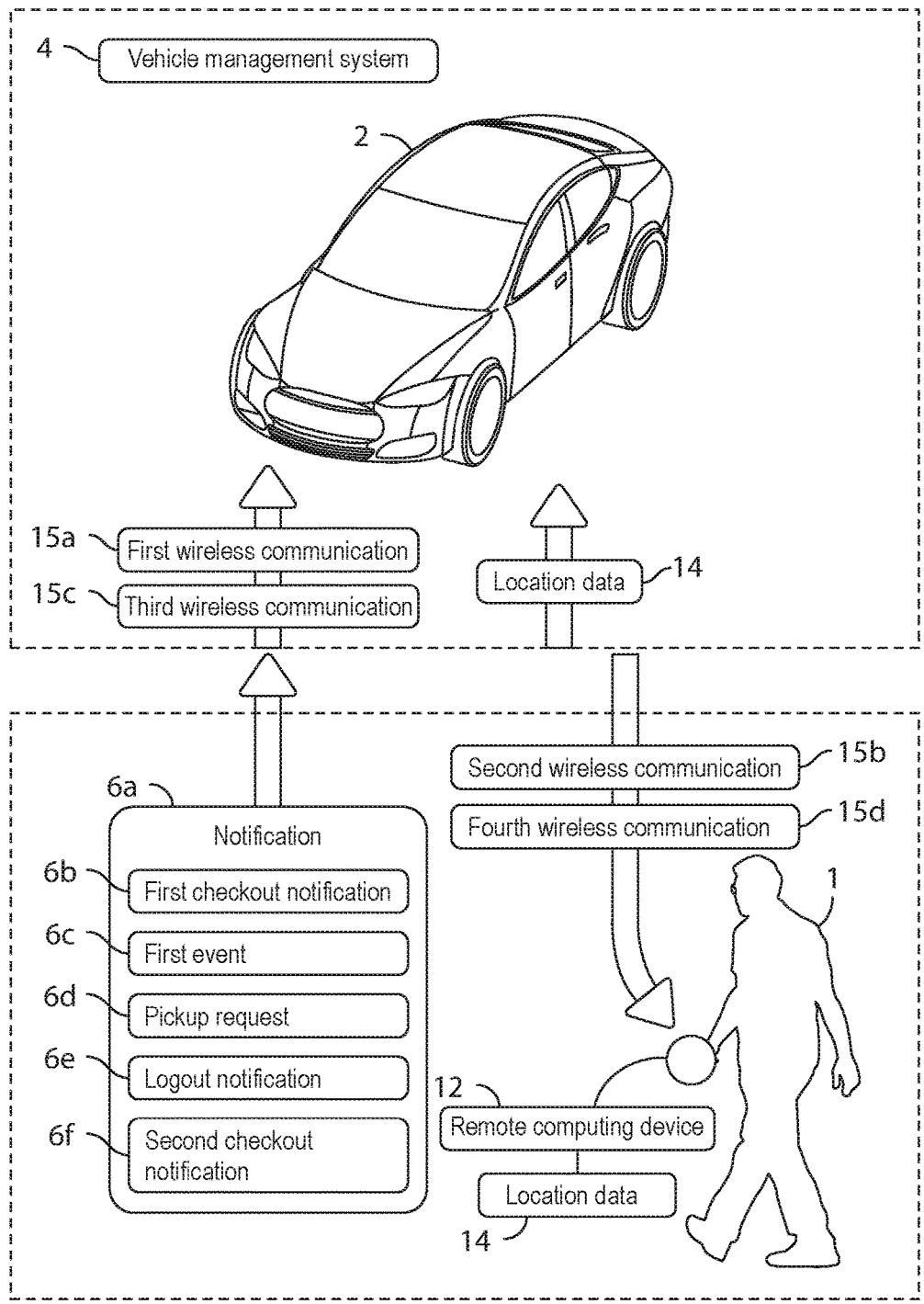
FIG. 2 illustrates a diagrammatic view of a self-driving vehicle, according to some embodiments.

As shown in FIG. 2, the notification 6a can be any type of notification that indicates that a person, such as the person 1 or another person, needs a ride from the vehicle 2. In some embodiments, the notification 6a comprises a checkout notification 6b, such as a notification that the person has purchased an item or service from a store. Accordingly, in some embodiments, the vehicle management system 4 receives the checkout notification 6b in response to the person 1 purchasing the item or service at the store.

Figure 3:
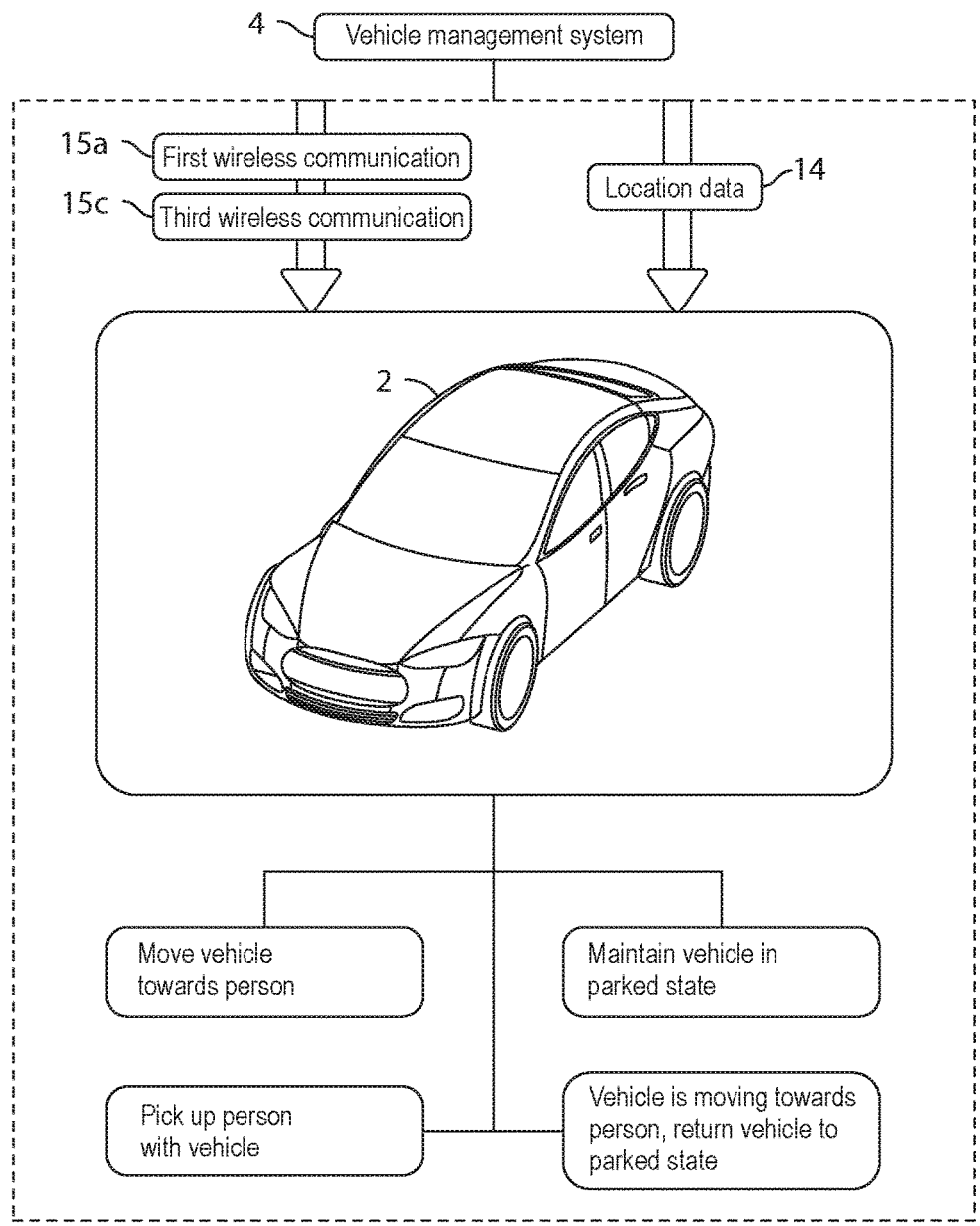
FIG. 3 illustrates a diagrammatic view of a method of using a self-driving vehicle, according to some embodiments.

According to FIGS. 2 and 3, the vehicle 2 and/or system 4 may perform actions in response to the system 4 receiving an indication of the notification 6a. For example, in response to receiving the notification 6a, such as the checkout notification 6b, the system 4 may send a second wireless communication 15b to the remote computing device 12. The second wireless communication 15b may prompt the remote computing device 12 to ask the person 1 whether the person 1 wants the vehicle 2 to move towards the person 1. In this regard, the system 4 can respond to the notification by sending an indication to the remote computing device 12 to determine whether the person 1 wants the vehicle 2 to move towards the person 1 (e.g. pick up the person 1). Because the vehicle 2 and/or system 4 can receive wireless communications while the vehicle 2 is in a parked state or a driving state, such as when the vehicle 2 is in a holding pattern (e.g. driving around the parking lot waiting for the person 1 to be picked up), the system 4 may receive the second wireless communication 15c. In some embodiments, the second wireless communication 15c may instruct the vehicle 2 to move to a parked state, enter the holding pattern, continue the holding pattern, or move towards a pickup location to retrieve the person 1. It should be appreciated that the phrase "parked state" means that the vehicle 2 remains in a stationary position or the vehicle 2 is in a non-pickup mode whereby the vehicle is moving but is not actively en route to pick up the person 1.

As shown in FIG. 2, the notification 6a can comprise various types of notifications and events, such as a first event 6c associated with the person 1. In some embodiments, the first event 6c may comprise a text message or email sent by the remote computing device 12, a post on a social network communicatively coupled to the remote computing device 12, such as status or "check in" posted on a social network (e.g. Facebook®, Twitter®, and the like). The first event 6c may also include other external events, such as a severe weather alert. For example, the system 4 may be configured to determine if severe weather is about to occur. In response to this determination, the vehicle 2 can move towards the person 1 to pick up the person 1 and take them out of harm's way.

The system 4 can also be configured to determine the occurrence of many other events, such as whether an event or appointment that the person is attending has concluded or is about to conclude whereby the event has a known ending time. For example, the system 4 can determine that the person 1 is attending a movie and the movie has ended or is about to end within a predetermined amount of time, such as within 5 minutes.

The system 4 can also be configured to determine whether an event or appointment that the person is attending has concluded or is about to conclude whereby the event has an unknown ending time. Described differently, many appointments and events, such as sporting events, can last for unknown amounts of time. For example, a baseball game may have a tie score whereby the game is extended into extra innings. In this regard, the system 4 can determine that the person 1 is not only attending the baseball game, but the system can determine, via a third party database, whether the game has been extended to extra innings. The system 4 may continue to monitor the progress of the baseball game and once the game is over, the vehicle 2 may be dispatched to retrieve the person 1. The system 4 may further be configured with advanced features, or analytics, to determine the conclusion of the event based upon statistical probabilities. For example, the system 4 may be monitoring the progress of the baseball game and the system 4 may determine that the home team has scored 7 runs in the bottom of the 12$^{th}$ inning and that the home team now leads by a score of 8-1. The system 4 may implement statistical analysis and determine that the other team has a very low statistical chance of scoring 7 or more runs during the top of the 13th inning. In response to this determination, the vehicle 2 may move towards the person 1 based upon the assumption that the game will end after the top of the 13$^{th}$ inning. It should be appreciated that these are just a few of the many examples of how statistical analysis and analytics can be used to predict the end of events with unknown ending times. Accordingly, in response to this analysis, the vehicle 2 and system 4 can respond by performing any appropriate action, as described in this disclosure.

The notification 6a can also include various notifications, such as a second checkout notification 6f The second checkout notification 6f can indicate that the person 1 has purchased a second item from the same store, or even a different store. This type of notification can indicate that the person 1 is still shopping and may not want to be picked up just yet. Alternatively, this type of notification can indicate that the person 1 has concluded her shopping and is ready to be picked up. The system 4 can learn the person's behavior patterns and respond to future occurrences in accordance with these patterns, which can indicate the person's desires.

In some embodiments, the system 4 receives the checkout notification 6b in response to the person 1 purchasing the item with a credit card. In response to the checkout notification, the vehicle 2 can thereby move towards the person 1. In some embodiments, the system 4 can further determine the location data 14 of the remote computing device 12 of the person in response to the checkout notification (e.g. credit card transaction) and the vehicle 2 can thereby move towards the location of the remote computing device 12. To further illustrate with a scenario, a person grocery shopping in a store may proceed through the checkout lane and pay for his/her groceries with a credit card. The vehicle 2 and/or system 4 can detect the occurrence of the credit card transaction, which can thereby indicate that the person 1 is done grocery shopping and about to leave the store. Accordingly, in response to the credit card transaction, the vehicle 2 can move towards the person, move to the location where the vehicle 2 dropped the person 1 off, move to a predetermined location, move to a location of the person's remote computing device 12 (which can indicate the location of the person 1), or move to any other location to thereby pick up the person 1.

Because so many people carry remote computing devices, such as smartphones, the system 4 can monitor and respond to various events associated with remote computing devices. For example, in some embodiments where the person 1 has a remote computing device 12, in response to the electronic payment transaction for a purchase of the item at the store, the system 4 can receive the checkout notification 6b, such as a first checkout notification 6b. It should be appreciated that the electronic payment transaction can be a mobile payment and/or digital wallet service, such as Apple Pay (provided by Apple Inc.) that lets users make payments with their remote computing devices, which include smartphones, wearable devices, tablets, and the like. It should also be appreciated that the electronic payment transaction can include services like Android Pay (provided by Android, Inc.), Samsung Pay (provided by Samsung Electronics Co., Ltd.), and the like.

Embodiments of the system 4 can also be configured to determine whether the remote computing device 12 is located within a predetermined distance of the vehicle 2. In this regard, the first wireless communication 15a can prompt the vehicle 2 to move towards the person 1 having the remote computing device 12 in response to the remote computing device 12 being located within the predetermined distance. For example, the system 4 may determine that the person 1 was previously located with respect to the vehicle a distance greater than the predetermined distance, but the person 1 has now moved to within the predetermined distance of the vehicle. Accordingly, this can indicate that the person 1 is ready to be picked up by the vehicle 2. In response, the vehicle 2 can move towards the person 1 to pick up the person 1. It should be appreciated that the predetermined distance can be any distance preset by the vehicle manufacturer, vehicle owner, vehicle operator, and anyone affiliated with the vehicle 2 and/or system 4. Additionally, the predetermined distance can be any distance such as 10 feet, 100 feet, 1,000 feet, 1 mile, and any distance greater than 1 mile.

The system 4 can also be configured to send various wireless communications to the vehicle 2 in response to the location of the remote computing device 12. In some embodiments, if the remote computing device 12 is not located within the predetermined distance of the vehicle 2, the system 4 can send a second wireless communication 15b to the remote computing device 12. However, in some embodiments, if the remote computing device 12 is located within the predetermined distance of the vehicle 2, the system 4 can send the second wireless communication 15b to the remote computing device 12. The second wireless communication 15b can prompt the remote computing device 12 to ask the person 1 whether the person 1 wants the vehicle 2 to move towards the person 1. To better illustrate with a real-life scenario, if the person 1 is shopping at a large shopping mall, the system 4 may determine that the remote computing device 12 (and the person 1) is located greater than 2,000 feet away from the vehicle 2, perhaps at the other end of the shopping mall. In response to this determination, the system 4 may then send the second wireless communication 15b to the remote computing device 12 to determine if the person 1 wants to get picked up at the other end of the shopping mall or if the person does not want to get picked up, because he/she wants to continue shopping.

As illustrated in FIGS. 2 and 3, the system 4 can also be configured to receive a third wireless communication 15c in response to the system 4 sending the second wireless communication 15b and/or the remote computing device 12 receiving the second wireless communication 15b. Stated differently, the remote computing device 12 can be configured to send the third wireless communication 15b in response to the system 4 sending the second wireless communication 15b and/or the remote computing device 12 receiving the second wireless communication 15b. Accordingly, in some embodiments, the system 4 can receive the third wireless communication 15c from the remote computing device 12. The third wireless communication 15c can include various instructions, such as first instructions to maintain the vehicle 2 in a parked state, second instructions to move the vehicle 2 towards the person 1, third instructions to put the vehicle 2 in a holding pattern mode whereby the vehicle 2 drives around a portion of a parking lot or roadway waiting for the person 1 to be ready to be picked up, and the like.

Furthermore, the third wireless communication 15c can include instructions to perform actions for a predetermined amount of time, or an amount of time until the system 4 receives a subsequent notification. For example, the third wireless communication 15c can include instructions to maintain the vehicle 2 in a parked state for a predetermined amount of time or maintain the holding pattern until the system 4 receives a subsequent notification indicating the person 1 is ready to be picked up. Once the predetermined amount of time has elapsed, the vehicle 2 can perform subsequent actions, such as any of the actions described in this disclosure, including moving towards the person 1.

Embodiments can also include communications between the person 1 and vehicle 2 and/or system 4 whereby the person 1 can provide specific location data 14 to the system 4 so that the vehicle 2 can pick up the person 1 at a desired location. For example, in some embodiments, in response to the system 4 receiving the third wireless communication 15c, the system 4 can send a fourth wireless communication 15d to the remote computing device 12. The fourth wireless communication 15d can prompt the remote computing device 12 to ask the person 1 where the person 1 wants to meet the vehicle 2. The system 4 can then receive desired location data for where the person 1 wants to meet the vehicle 2. This configuration can provide user convenience for instances when portions of the roadway are congested with traffic. Accordingly, the person 1 (i.e. user) can thereby summon the vehicle to a new desired location with less traffic.

Figure 4:
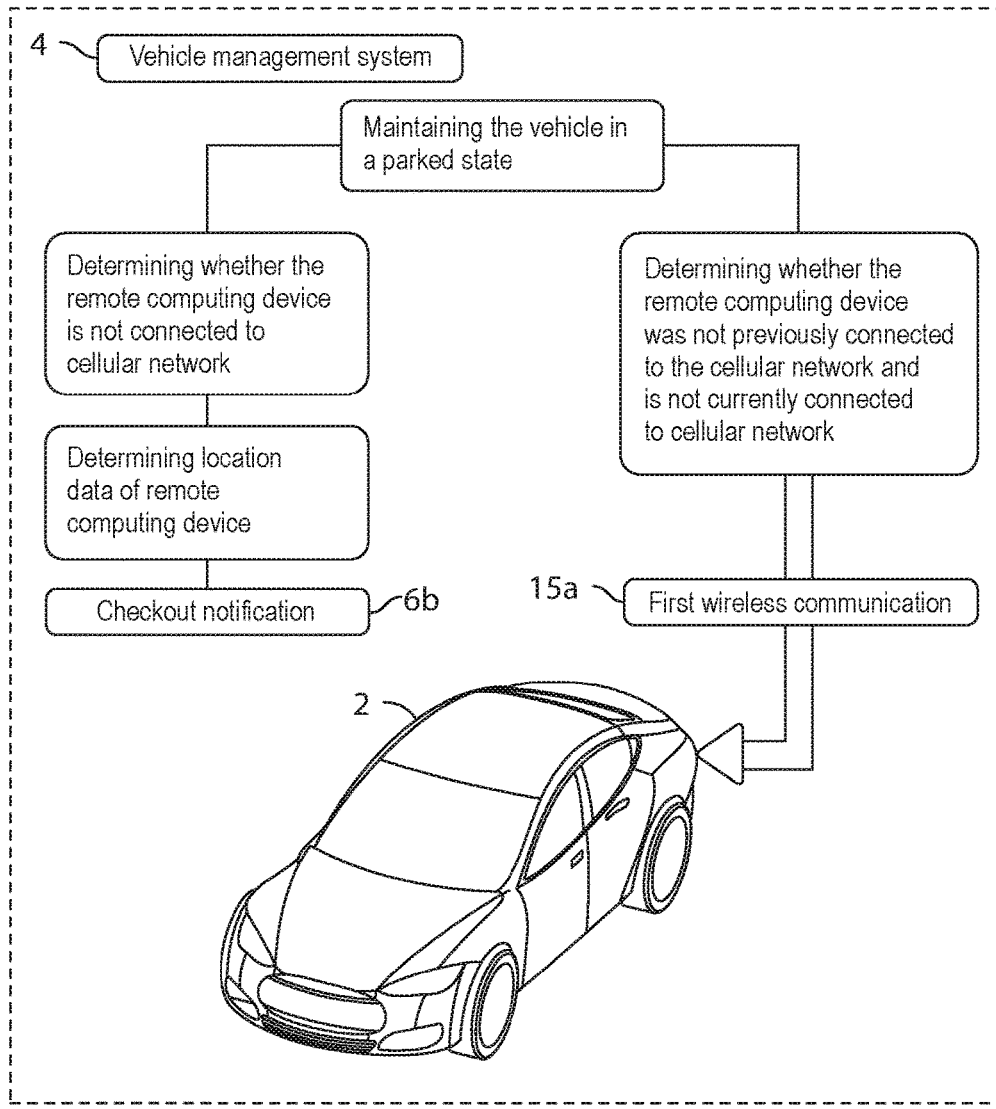
FIG. 4 illustrates a diagrammatic view of another method of using a self-driving vehicle, according to some embodiments.
Figure 4:
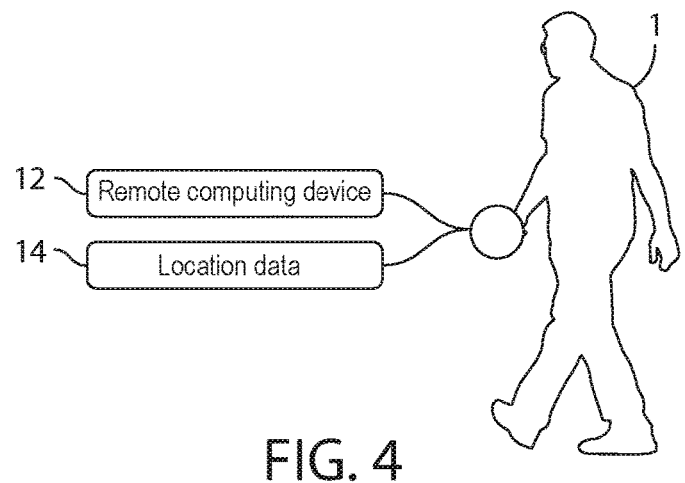

The system 4 can also be configured to perform advanced steps to more accurately determine not only whether the person 1 is in need of a ride from the vehicle 2, but also the location of the remote computing device 12 and/or person 1. With reference to FIGS. 3 and 4, in some embodiments, the system 4 can determine the connectivity of the remote computing device 12 and thereby perform actions with the vehicle 2 in response to the connectivity of the remote computing device 12. In some embodiments, in response to receiving a notification of an occurrence of an event, such as the checkout notification 6b, the system 4 can then determine whether the remote computing device 12 is connected to a cellular network and/or a wireless network. In response to determining the remote computing device 12 is not connected to the cellular network, the system 4 can maintain the vehicle 2 in a parked state. Described in further detail, the system 4 may detect that the person has purchased an item from a store, and the system 4 may perform additional verifications to determine whether the person 1 is actually leaving the store. As such, in response to the checkout notification 6b, the system 4 may determine that the remote computing device 12 is not connected to the cellular network, which may indicate that the person and the remote computing device 12 are still located inside the store. The system 4 may determine that the remote computing device 12 is instead connected to the wireless network (perhaps the wireless network operated by the store), which may further indicate that the person is still inside the store and not yet ready to leave. Embodiments of the system 4 may be configured to respond to these determinations in any number of ways, such as moving the vehicle 2 towards the person 1, maintaining the vehicle 2 in a parked state, and the like.

The system 4 may also perform additional steps to determine whether the person 1 is ready to be picked up by the vehicle 2. In some embodiments, the system 4 may determine whether the remote computing device 12 was previously not connected to the cellular network and then determine whether the remote computing device 12 is subsequently connected to the cellular network. Additionally, in some embodiments, the system 4 may send the first wireless communication 15a to the vehicle 2 in response to determining that the remote computing device 12 was previously not connected to the cellular network and then determining whether the remote computing device is subsequently connected to the cellular network. This sequence may indicate that the person 1 was located inside a building where her remote computing device 12 was unable to receive a signal, and then the person 1 moved near the exit of the building or even outside the building whereby her remote computing device 12 was able to receive a signal. This may indicate that the person 1 needs to be picked up by the vehicle 2.

Figure 5:
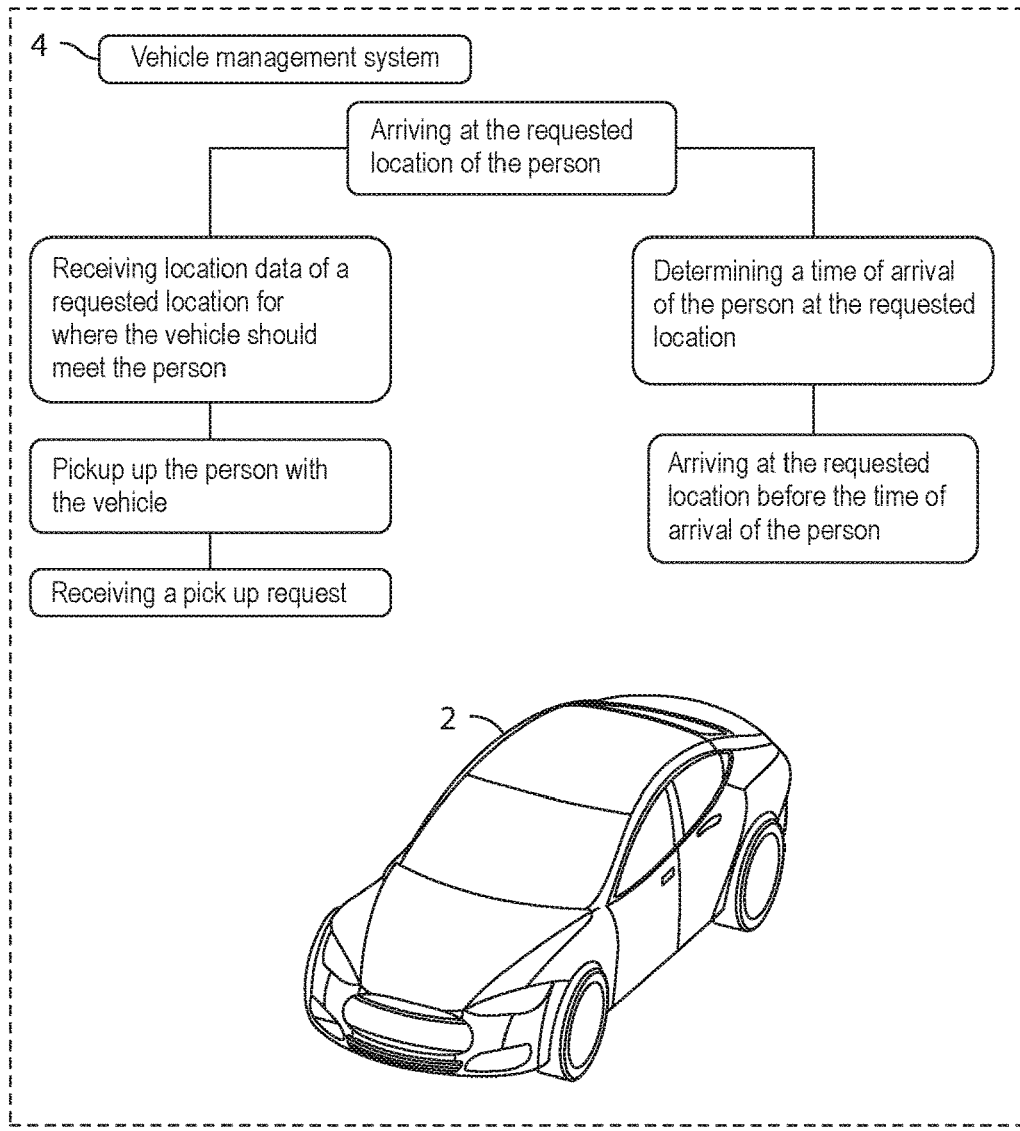
FIG. 5 illustrates a diagrammatic view of another method of using a self-driving vehicle, according to some embodiments.

The system 4 may also be configured to receive manual summons requests from the person 1, whereby the summons request can indicate that the person 1 would like to be picked up by the vehicle 2. As illustrated in FIG. 5, in some embodiments, the system 4 may receive a pickup request 6d for the vehicle 2 to pick up the person 1. Accordingly, the vehicle 2 may move towards the person 1 and/or pick up the person 1. It should be appreciated that the person 1 may manually summon the vehicle 2 by submitting a request through her remote computing device 12, which can be received by the system 4.

The system 4 can also be configured to search for location data 14 of the remote computing device 12. In some embodiments, searching for the location data 14 occurs in response to various other events or notifications 6a, such as the electronic payment transaction. In this regard, the system 4 can determine the location of the remote computing device 12, and because the person 1 likely has the remote computing device 12 close by, or coupled to her person, the location data 14 can thereby indicate the location of the person 1. Accordingly, the system 4 can also be configured to send the location data 14 of the remote computing device 12 to the vehicle 2. The location data 14 can thereby allow the vehicle 2 to drive towards the location of the remote computing device 12, to thereby retrieve the person 1.

As illustrated in FIG. 5, some embodiments of the system 4 can also receive a requested pickup location that indicates where the person 1 would like to be picked up by the vehicle 2. In this manner, the person 1 may request the pickup location in a number of ways. In some embodiments, the person 1 sends a text message, via the remote computing device 12, which includes location data, such as a street address, to the system 4. The text message can thereby instruct the vehicle 2 to pick up the person at a requested location 20. In some embodiments, the person 1 drops a pin on a map displayed on the screen of the remote computing device 12 to indicate the location where the person 1 would like to be picked up. Once the system 4 receives the requested location 20, the vehicle 2 can thereby travel towards the requested location 20 of the person 1. The system 4 can also be configured to recognize frequently visited, or known locations, such as home, work, and the like.

With continued reference to FIG. 5, the system 4 may also perform additional steps to precisely coordinate the arrival time of the person 1 at the requested location 20 with the arrival time of the vehicle 2 at the requested location 20. Accordingly, the system 4 may determine a time of arrival of the person at the requested location 20. In some embodiments, the vehicle 2 may arrive at the requested location 20 at approximately the time of arrival of the person. In other words, the person 1 and the vehicle 2 arrive at the requested location 20 at approximately the same time. In some embodiments, the vehicle 2 may arrive at the requested location 20 before the time of arrival of the person 1. Even still, in some embodiments, the vehicle 2 may arrive at the requested location 20 after the time of arrival of the person. It should be appreciated the term "approximately" may be defined as arriving within plus or minus 5 minutes. In other words, the person 1 and the vehicle 2 may arrive at the requested location 20 within 5 minutes of each other.

Figure 6:
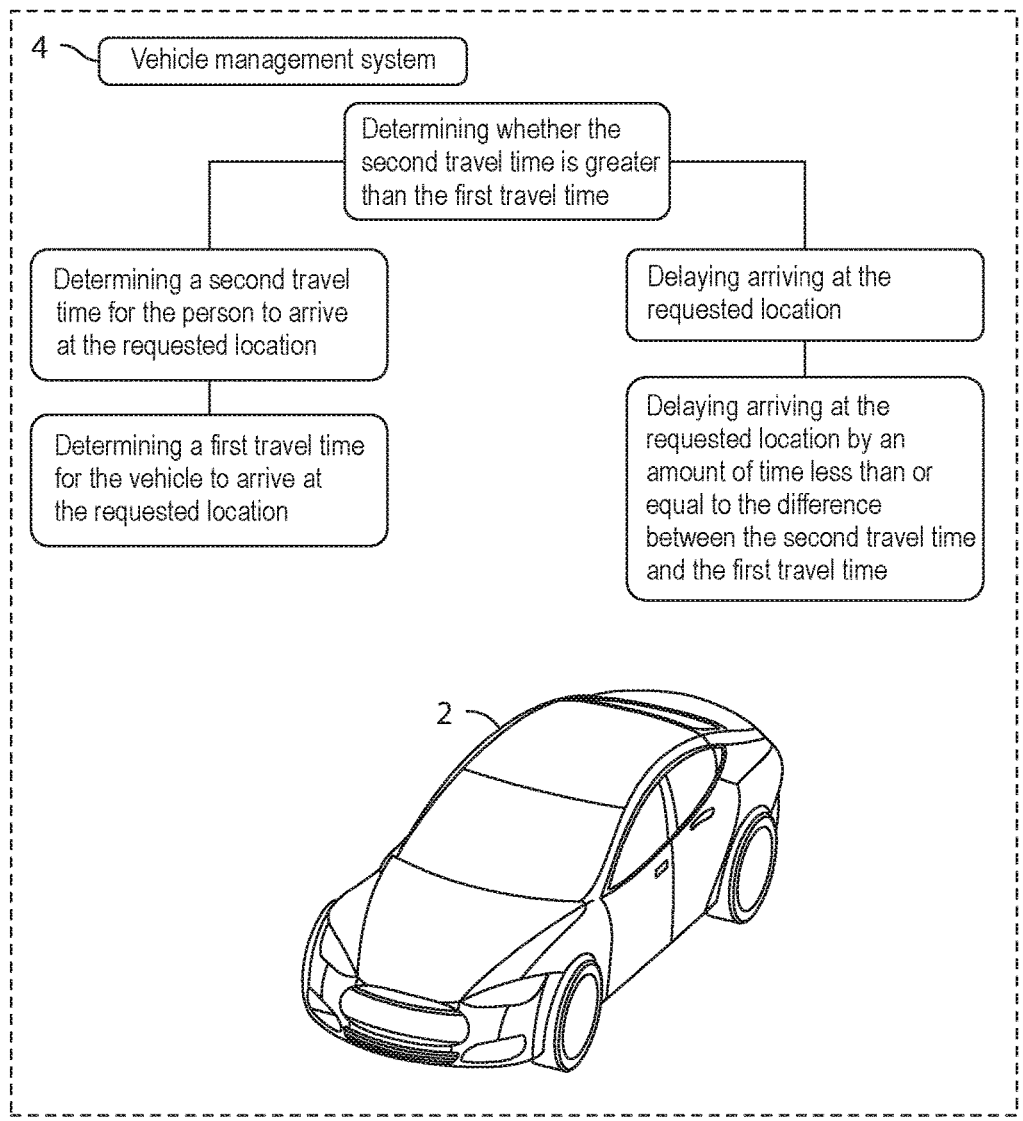
FIG. 6 illustrates a diagrammatic view of another method of using a self-driving vehicle, according to some embodiments.
Figure 6:
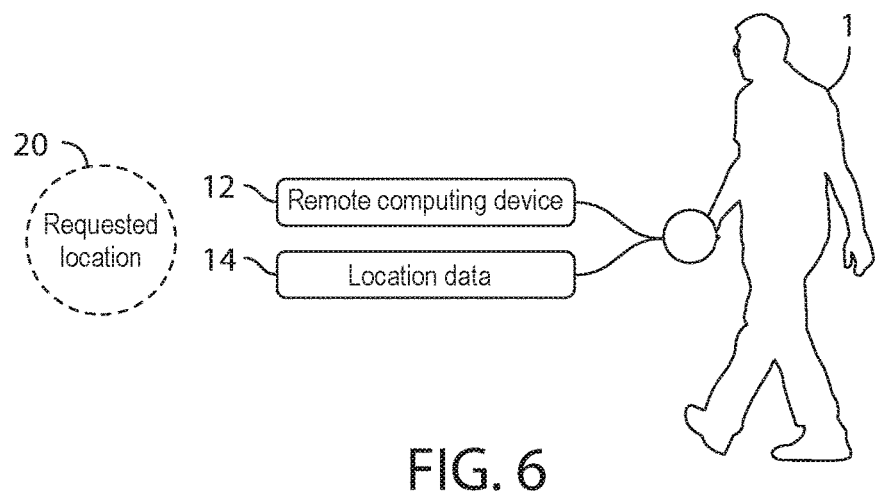

The system 4 may even determine travel times for the person 1 and vehicle 2 to the requested location 20 and thereby coordinate the departure of the vehicle 2 so that it corresponds with the arrival of the person 1. As illustrated in FIG. 6, the system 4 may determine a first travel time for the vehicle 2 to arrive at the requested location 20. The system 4 may also determine a second travel time for the person 1 to arrive at the requested location 20. The system 4 may then determine whether the second travel time is greater than the first travel time, or whether the second travel time is equal to or less than the first travel time. In response to the system 4 determining that the second travel time is greater than the first travel time, the system 4 may delay the vehicle's departure by an amount of time so that the vehicle arrives at the requested location 20 at approximately the same time as the person 1. In other words, the system 4 can delay the vehicle 4 arriving at the requested location 20 in response to determining the second travel time is greater than the first travel time. In some embodiments, delaying arriving at the requested location 20 can include delaying arriving at the requested location 20 by an amount of time less than or equal to the difference between the second travel time and the first travel time. In response to the system 4 determining that the second travel time is equal to or less than the first travel time, the system 4 may immediately dispatch the vehicle 2 so that the vehicle 2 arrives at the requested location 20 as close as possible to the arrival time of the person 1. In the event that the second travel time is less than the first travel time, the system 4 may send a notification to the remote computing device 12 to thereby notify the person 1 that the vehicle 2 will arrive later then the person 1.

Figure 7:
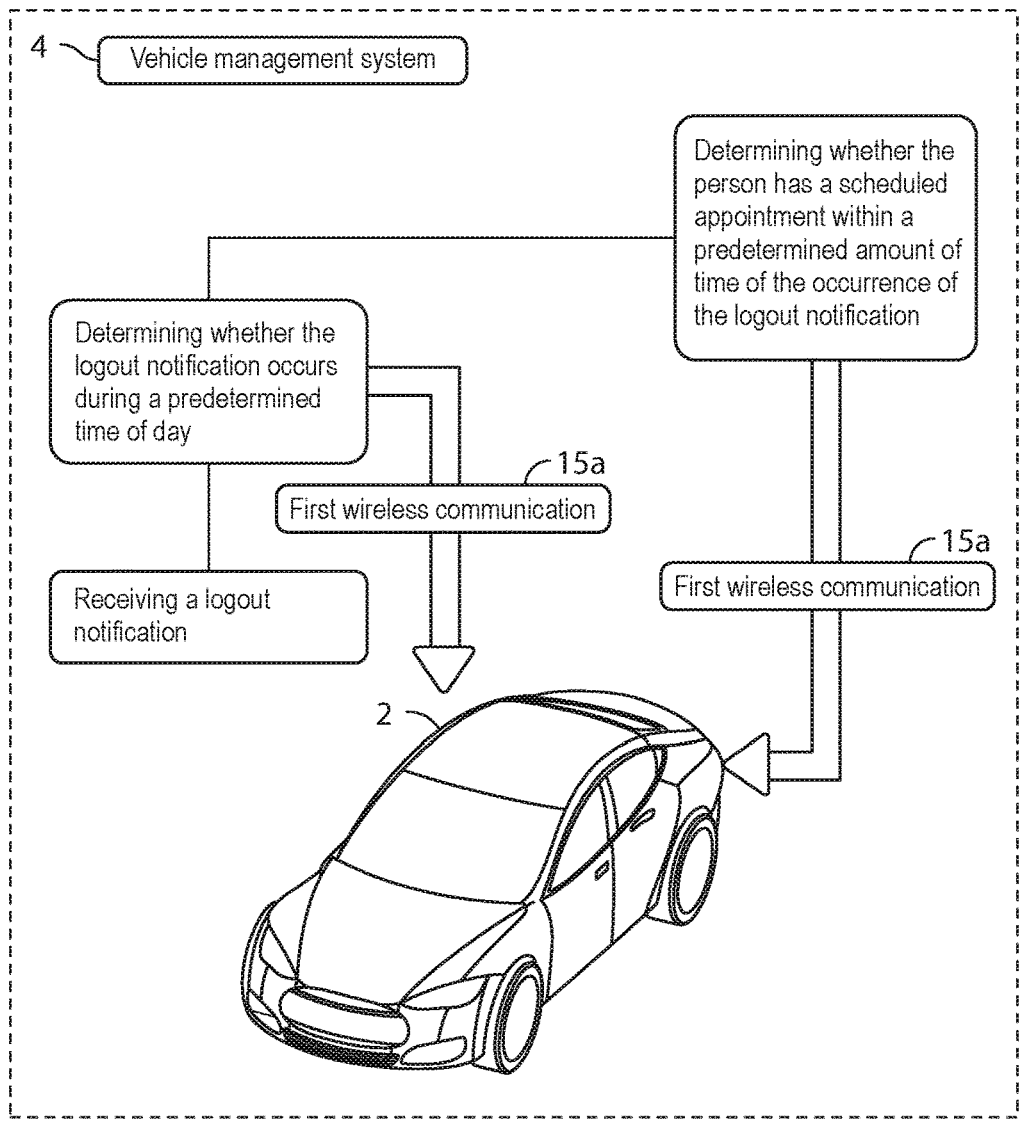
FIG. 7 illustrates a diagrammatic view of another method of using a self-driving vehicle, according to some embodiments.
Figure 7:
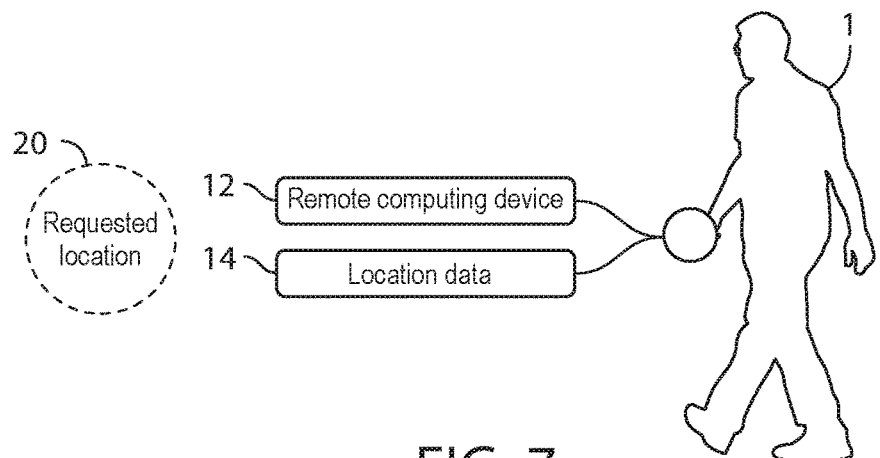

This disclosure also includes embodiments configured to monitor a person's computer activity and then pick up the person 1 in response to the activity. Specifically, these embodiments can be useful during the workday while the person 1 is at work. Accordingly, the notification 6a can include various computer notifications, such as a logout notification 6e whereby the person 1 logs out of a computer, such as a work computer. As shown in FIG. 7, the system 4 can receive the logout notification 6e in response to the person logging out of a computer. The logout notification 6e can indicate that the person 1 is leaving work for the day and the person 1 needs to be picked up by the vehicle 2. In response to the system 4 receiving the logout notification 6e, the vehicle 2 can then move towards a location to pick up the person 1.

People often logout out of their computers at various times during the middle of the workday but don't intend to leave work. Rather, the person may log out for various activities that commonly occur during the workday and/or occur onsite at the office, such as meetings, bathroom breaks, coffee breaks, and the like. In some embodiments, the system 4 may determine that the logout notification 6e occurs during a predetermined time of day. Accordingly, the system 4 may send the first wireless communication 15a to the vehicle 2 in response to receiving the logout notification 6e and the logout notification 6e occurring during the predetermined time of day. In other words, the system 4 can be configured to pick up or not pick up the person in response to the logout notification 6e. For example, if the logout notification 6e occurs during a predetermined time of day, such as during working hours (e.g. 9 am to 5 pm), then the system 4 may not instruct the vehicle 2 to pick up the person 1. Whereas, if the logout notification 6e occurs during a second predetermined time of day, such as after 5 pm, then the system 4 may instruct the vehicle 2 to pick up the person 1 because this time is after the person's workday has ended.

However, there are exceptions to this criteria, such as if the logout notification 6e occurs during lunch hours (e.g. 11 am to 1 pm). Accordingly, in response to the logout notification occurring during lunch hours, the vehicle 2 may move towards the person 1 to pick up the person 1 and take them to a restaurant or to an offsite appointment.

Additionally, the system 4 may be configured to determine if the logout notification 6e occurs within a predetermined amount of time of a scheduled appointment. The system 4 may further determine the location of the scheduled appointment. For example, if the system 4 determines that the scheduled appointment is located offsite (i.e. located remotely to the person's work), and the system 4 determines that the scheduled appointment occurs within a predetermined amount of time of the occurrence of the logout notification 6e, then the system 4 may instruct the vehicle 2 to move towards the person 1 to pick him or her up. Furthermore, if the system 4 determines that the scheduled appointment is located onsite (i.e. the appointment is located in the same building as the person's work or within a very short distance, such as 500 feet away), and the system 4 determines that the scheduled appointment occurs within a predetermined amount of time of the occurrence of the logout notification 6e, then the system 4 may not instruct the vehicle 2 to move towards the person 1 to pick him or her up.

Systems and methods may also be configured to determine the signal strength of the remote computing device 12, which may further indicate the person's location and need for a ride from the vehicle 2. In some embodiments, the system 4 is configured to determine whether a remote computing device 12 associated with the person 1 is disconnected from the cellular network or connected to the cellular network, but with a first signal that is less than a predetermined level. The system 4 can then determine whether the remote computing device 12 is connected to the cellular network with a second signal greater than or equal to the predetermined level. If the system determines that the remote computing device 12 is connected to the cellular network with the first signal that is less (weaker) than the predetermined level, then this may indicate that the person 1 was previously inside the building (e.g. the store) and her remote computing device 12 was receiving no signal or a weak signal. The subsequent determination that the remote computing device 12 is connected to the cellular network with the second signal strength that is greater than or equal to the predetermined level may indicate that the person 1 is outside the building or closer to the exit of the building whereby her remote computing device 12 is receiving a stronger signal. These determinations taken in sequence may indicate that the person 1 is thereby moving toward the exit and in need of a ride from the vehicle 2. In response to one or both of these determinations, the system 4 may send a first wireless communication to the vehicle 2. In some embodiments, the predetermined threshold is equal to the first signal. In some embodiments, the predetermined threshold is equal to the second signal. It should be appreciated that stating that a signal is greater than, less than, or equal to a predetermined level is referring to the strength of the signal.

Figure 8:
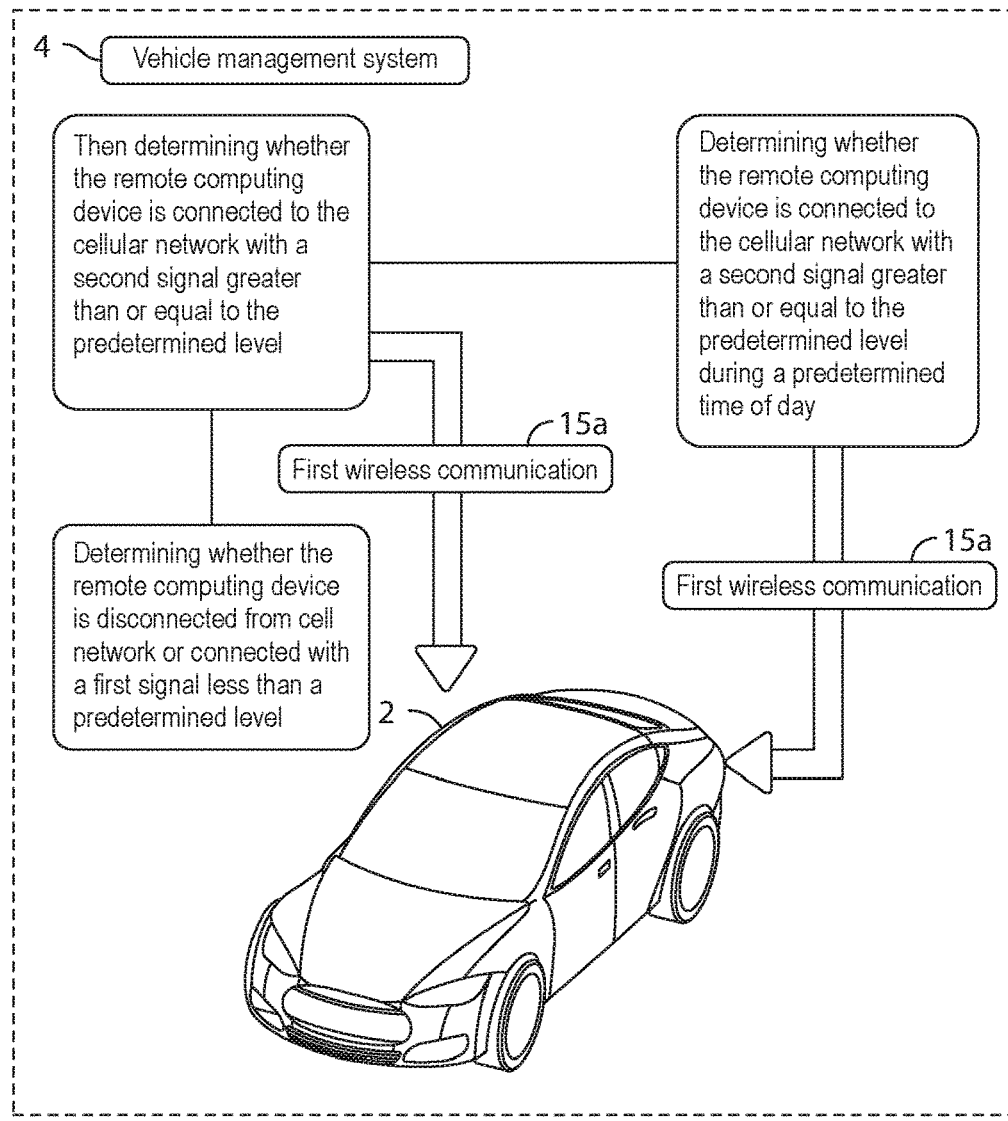
FIG. 8 illustrates a diagrammatic view of another method of using a self-driving vehicle, according to some embodiments.
Figure 8:
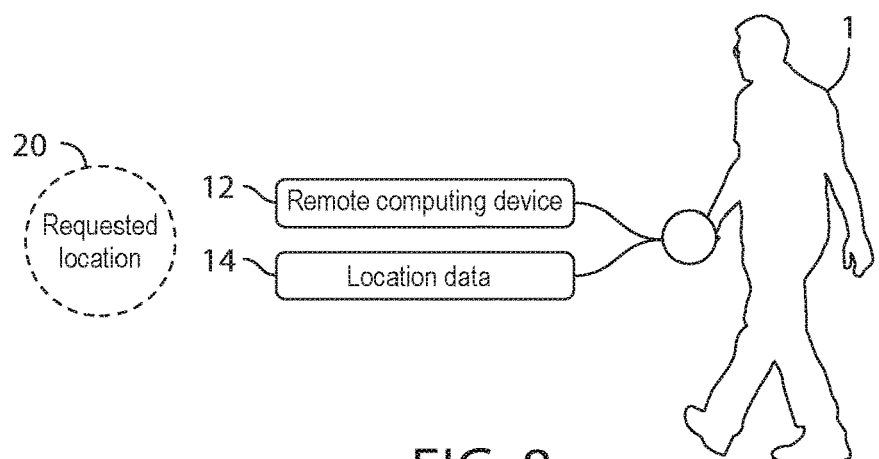

The system 4 may also be configured to further determine the person's need for a ride from the vehicle 2 by tracking the signal strength of the remote computing device 12 at predetermined times of day. As shown in FIG. 8, in some embodiments, the system 4 may determine whether the remote computing device 12 is connected to the cellular network with a second signal greater than or equal to the predetermined level during a predetermined time of day. In this regard, the system 4 may determine that the remote computing device 12 is connected to the cellular network with a second signal greater than the predetermined threshold. However, determining signal strength alone may not provide enough information for the system 4 to accurately conclude whether the person 1 needs a ride from the vehicle 2.

In this regard, the determination of the second signal strength can be further augmented by the system 4 determining if the second signal occurs during a specific time of day, such as between 10 am and 6 pm, or after 6 pm. For example, if the system 4 determines that the second signal is greater than the predetermined threshold at 2 pm, then this might indicate that the person 1 is outside of the building or near the entrance but is not actually leaving the building. For example, the person 1 might be taking a short walk break outside the building whereby the remote computing device 12 receives a stronger signal as compared to when the remote computing device 12 is inside the building. On the other hand, if the system 4 determines that the second signal is greater than the predetermined threshold at 7 pm, then this might indicate that the person 1 is near the entrance or physically outside the building, but more importantly, this determination might indicate that the person 1 is leaving work. In response to this determination, the vehicle 2 can begin moving towards the person 1 to pick the person 1 up.

Figure 9:
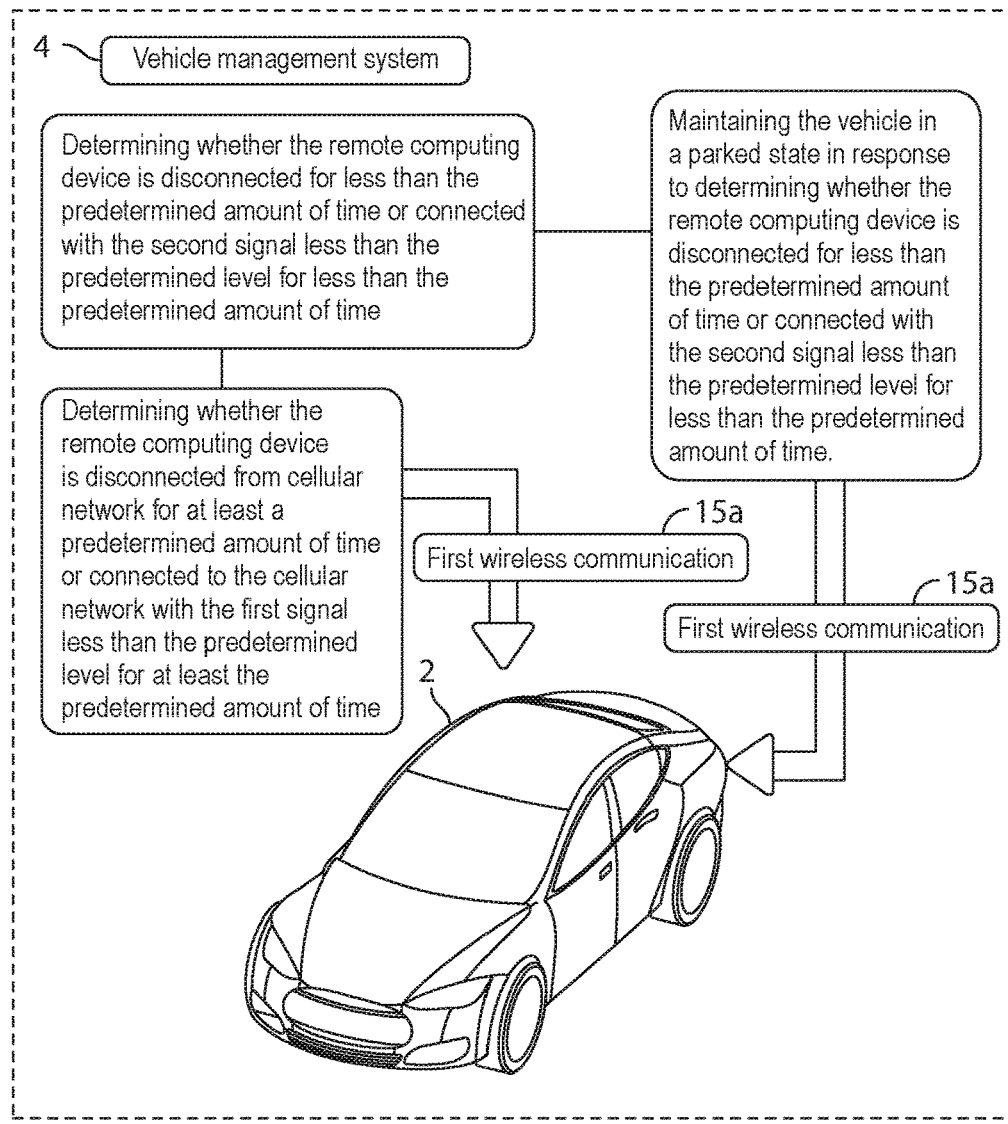
FIG. 9 illustrates a diagrammatic view of another method of using a self-driving vehicle, according to some embodiments.
Figure 9:
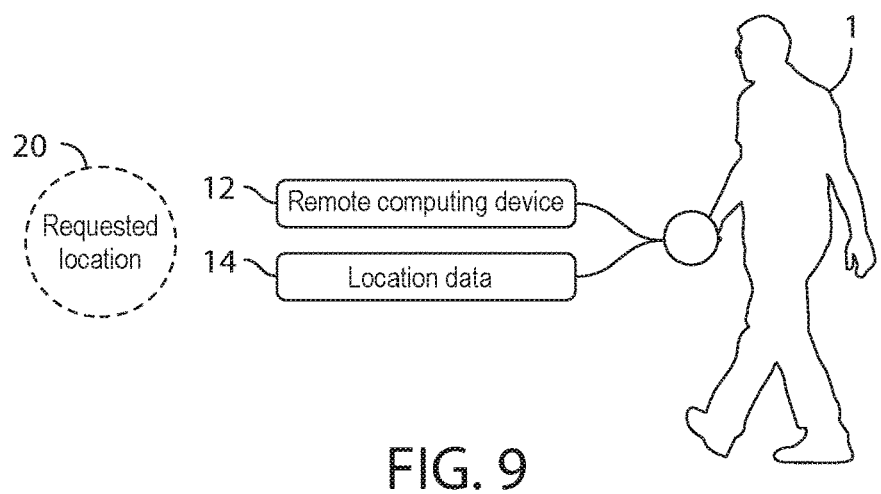

In addition to determining the signal strength of the remote computing device 12 during predetermined times of day, the system 4 may also be configured to determine how long the remote computing device 12 is receiving a signal with a strength greater than or less than the predetermined threshold. As shown in FIG. 9, the system 4 can be configured to determine whether the remote computing device 12 is disconnected from the cellular network for at least a predetermined amount of time or connected to the cellular network with the first signal less than the predetermined level for at least the predetermined amount of time.

In this regard, the system 4 can send the first wireless communication to the vehicle 2 in response to determining whether the remote computing device 12 is disconnected from the cellular network for at least a predetermined amount of time or connected to the cellular network with the first signal less than the predetermined level for at least the predetermined amount of time. To further illustrate with an example, the person 1 may be moving between areas of the building where the cellular signal or Wi-Fi signal of the remote computing device 12 is impaired. For example, the person 1 might be in an elevator whereby the remote computing device 12 receives a diminished signal or no signal at all. Furthermore, depending upon which floor the person 1 is going to, the system 4 may determine the amount of time that the remote computing device 12 receives the diminished signal and then interpret this differently.

For example, a person 1 may have an office on the $40^{th}$ floor so when the person 1 leaves the office for the day, the person 1 likely has to take the elevator to the $1^{st}$ floor. Accordingly, the system 4 can determine how long it commonly takes to travel from the $40^{th}$ floor to the $1^{st}$ floor (plus-minus additional time depending on whether the elevator has to pick up or drop off other passengers). Accordingly, in some instances, the person 1 might travel from the $40^{th}$ floor to another floor within the building (e.g. the $25^{th}$ floor). In this regard, the system 4 may determine that the remote computing device 12 received a diminished signal for an amount of time less than the amount it takes to travel from the $40^{th}$ floor to the Pt floor. As such, the system 4 may interpret this to mean that the person 1 is not leaving the building and is instead simply moving between floors in the building, without intending to leave the office. Therefore, the system 4 may maintain the vehicle 2 in a parked state in response to determining that the remote computing device 12 is disconnected from the cellular network (or connected to the cellular network with the second signal less than the predetermined level) for less than the predetermined amount of time. In some embodiments, the predetermined amount of time may be the amount of time it commonly takes for the person 1 to travel by elevator from her work floor to the ground level.

Generally, it should be appreciated that the system 4 can learn the person's day-to-day behavioral patterns and the system 4 can adapt its responses accordingly. Because machine learning can require more than one data point, the system 4 can also be configured to receive manual inputs from a user, such as the person 1. For example, if the person 1 relocates her desk from the $40^{th}$ floor to the $25^{th}$ floor, the system 4 may be configured to receive a manual input whereby the person 1 can override the previous learning of the system 4. In this regard, the system 4 can be fully configured to automatically learn and adjust to a person's behavior, as well as be manually configured to a specific setting as dictated by the user.

Lost Communication Embodiments In the past, people parked their vehicles and then had to remember where they parked their vehicles. Various systems were later invented to help people remember the location of their vehicles. For example, Apple iPhones include a feature that remembers the location at which a user parks her car.

Self-driving vehicles 2, however, present a major difficulty: These vehicles sometimes can park themselves when users are not in the vehicle, so users (e.g., people who use the cars to get rides) might not know where to find their vehicles. This is often not a problem because a person can use a remote computing device 12 such as a smartphone (e.g., an iPhone) or a tablet device (e.g., an iPad) to open an app that summon a vehicle 2 to pick up the person. Some of the embodiments described herein address how the system picks up the user in the event that the user's smartphone is lost, broken, or has a dead battery (such that the person cannot use her smartphone to tell the vehicle when and/or where to pick her up). The vehicle management system 65 and the self-driving vehicle 2 can thereby respond in a number of ways, such as sending a self-driving vehicle 2 to a pick-up location in an attempt to pick-up the user.

The vehicle management system 65 can be a portion of the self-driving vehicle 2. Communication between the vehicle 2 and the vehicle management system 65 can occur via electrical wires that couple the vehicle management system 65 to other portions of the vehicle 2.

Additionally, the vehicle management system 65 can be located remotely relative to the self-driving vehicle 2. Communication between the vehicle 2 and the vehicle management system 65 can occur via wireless communications that travel over intermediary communication systems.

In some embodiments, intermediary communication systems are used to perform each step. Intermediary communication systems can comprise wireless networks, Wi-Fi routers, Bluetooth systems, cellular networks, telephone networks, Internet systems, servers, cloud computing, remotely located computers, satellite systems, communication systems, and any other suitable means of enabling communication between the various components.

Furthermore, the communicative coupling between the remote computing device 12 and the vehicle management system 65 is via intermediary communication systems. In other words, intermediary communication systems can communicatively couple the remote computing device 12 and the vehicle management system 65. This communicative coupling may be via intermittent wireless communications. For example, the vehicle management system 65 may send a wireless message to the remote computing device 12 periodically (e.g., every 10 seconds, every 60 seconds, every 10 minutes). As used herein, "periodically" does not imply that every period has the same duration. In some embodiments, the communicative coupling between the self-driving vehicle 2 and the vehicle management system 65 is via intermediary communication systems.

Figure 10:
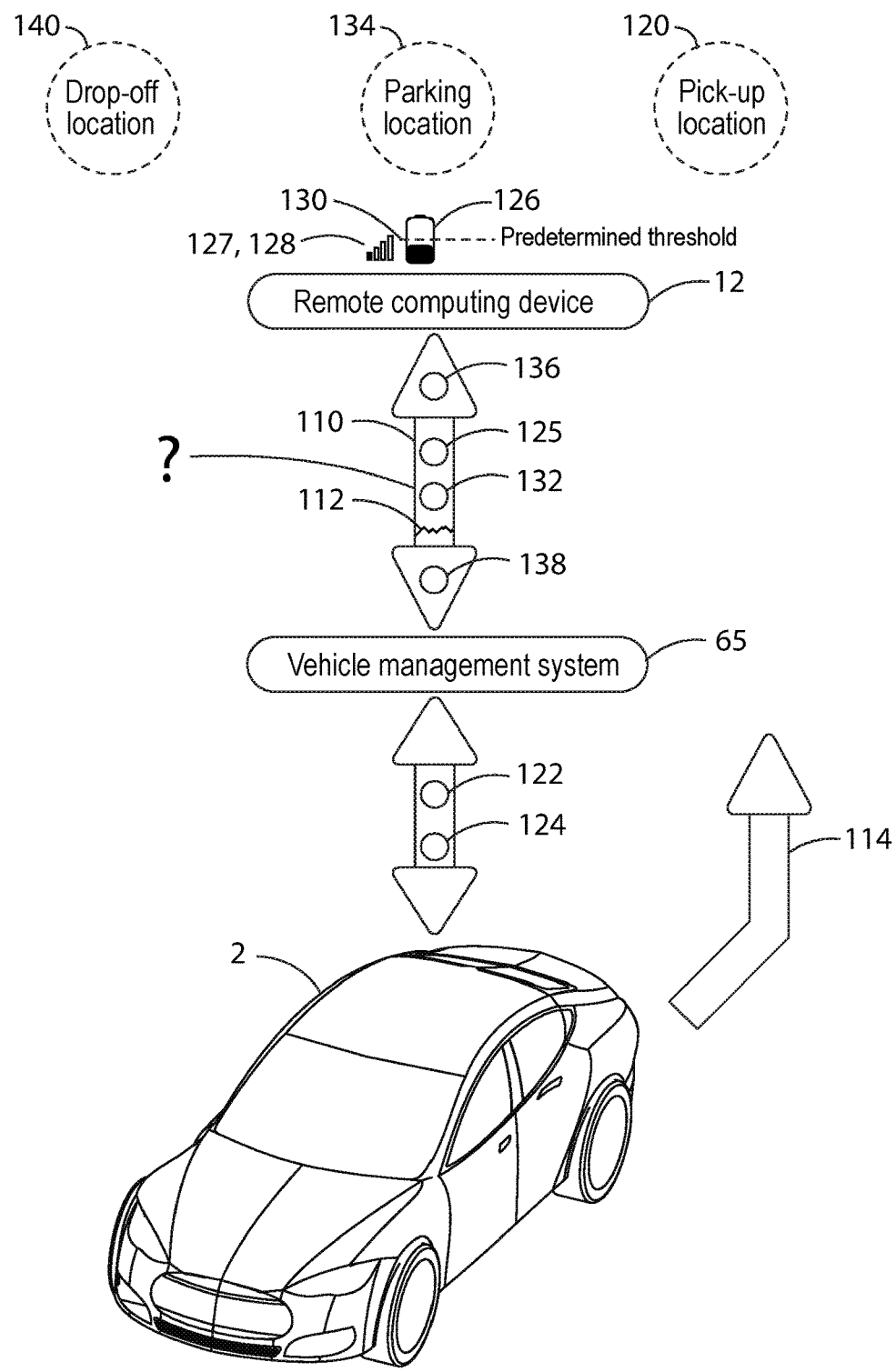
FIG. 10 illustrates a diagrammatic view of another method of using a self-driving vehicle, according to some embodiments.

With reference to FIG. 10, many embodiments include a method of using the vehicle management system 65 to operate the self-driving vehicle 2. The vehicle management system 65 is configured to be communicatively coupled with a remote computing device 12, which is thereby configured to operate software, such as an iPhone application or an Android application adapted to enable a user to control behaviors of the self-driving vehicle 2. Behaviors can include actions and non-actions of the self-driving vehicle 2, such as picking up the user at a location, picking up the user at a time based on a schedule of the user or a time based on past pick-up times, remaining idle, driving to a residence of the user, pulling out of a garage, parking the vehicle, getting gas, charging the vehicle, and the like.

As illustrated by arrow 110 in FIG. 10, methods include coupling communicatively, by the vehicle management system 65, the remote computing device 12 to the self-driving vehicle 2. The user may thereby use the remote computing device 12 to perform such actions as determining a location of the self-driving vehicle 2 and controlling movements of the self-driving vehicle 2. As shown by arrow 112, methods also include determining, by the vehicle management system 65, that the remote computing device 12 is no longer communicatively coupled to the vehicle management system 65.

Once this determination has been made, the vehicle management system 65 may perform any number of actions. In some embodiments, the vehicle management system 65 identifies a pick-up location 120 of the user. Accordingly, the vehicle management system 65 may thereby send 114 the self-driving vehicle 2 to the pick-up location 120 in response to determining that the remote computing device 12 is no longer communicatively coupled to the vehicle management system 65. In some embodiments, the vehicle management system 65 sends a command or an instruction 122, which causes the self-driving vehicle 2 to travel to the pick-up location 120.

Additionally, several embodiments comprise sending, by the vehicle management system 65, the self-driving vehicle 2 to a pick-up location 120 in response to (1) detecting, by the remote computing device 12, a battery charge indication below a predetermined threshold and in response to (2) determining, by the vehicle management system 65, that the remote computing device 12 is no longer communicatively coupled to the vehicle management system 65. Furthermore, methods include sending, by the vehicle management system 65, the self-driving vehicle 2 to a pick-up location 120 in response to (1) detecting, by the vehicle management system 65, a battery charge indication below a predetermined threshold (e.g., by asking the remote computing device 12 for its battery status and then receiving the battery status data from the remote computing device 12) and in response to (2) determining, by the vehicle management system 65, that the remote computing device 12 is no longer communicatively coupled to the vehicle management system 65.

Methods may also include sending, by the vehicle management system 65, the self-driving vehicle 2 to the pick-up location 120 in response to an estimated pick-up time 124. In other words, if the vehicle management system 65 loses contact with the remote computing device 12, the system 65 will wait until a time that is closer to the estimated pick-up time before sending the vehicle 2 to the pick-up location 120. This may reduce the occurrence of false positives (e.g. false alarms or unnecessary pick-up attempts). For example, a user may travel to a confined location, such as a basement, whereby the remote computing device 12 loses communication with the vehicle management system 65. In such an instance, the system 65 may wait until at least a predetermined amount of time has elapsed, such as at least 20 minutes, after determining the remote computing device 12 is no longer communicating with the vehicle management system 65 before sending the vehicle 2 to the pick-up location 120. As such, waiting to send the vehicle 2 to the pick-up location may thereby reduce the occurrence of unnecessary pick-up attempts.

The vehicle management system 65 may further be arranged and configured to take more deliberate steps to determine whether the remote computing device 12 is no longer communicatively coupled with the vehicle management system 65. For example, methods may include determining, by the vehicle management system 65, that the remote computing device 12 is no longer communicatively coupled to the vehicle management system 65 by sending a wireless communication 125 to the remote computing device 12. The system 65 may thereby determine that the remote computing device 12 did not respond to the wireless communication 125 and thereby send the vehicle 2 to the pick-up location 120.

Additionally, the vehicle management system 65 may employ other methods to determine that the remote computing device 12 is no longer communicatively coupled to the system 65. In some embodiments, methods include determining, by the vehicle management system 65, that the remote computing device 12 is no longer communicatively coupled to the vehicle management system 65 by determining that a present battery power 127 of a battery 126 of the remote computing device 12 is depleted below a predetermined threshold 130 of the battery power 128. The predetermined threshold may be any amount or percentage of the battery power 128, such as 90%, 50%, 20%, 10%, 5%, 1%, and even 0%. In some embodiments, the battery power 128 is the initial overall battery capacity (at the time of purchase) or the present overall battery capacity (at the present time of performing the method steps) of the remote computing device 12. This can ensure that the system 65 accounts for changes, over time, to the performance of the remote computing device 65 so that the system 65 and vehicle 2 provide service that matches the present day conditions of the remote computing device 12. However, in some embodiments, the system 65 is programmed not to account for changes in battery performance to the remote computing device 12.

In several cases, the vehicle management system 65 will be able to distinguish between a remote computing device 12 that has a dead battery and a remote computing device 12 that is simply turned off. If the battery 126 is dead, then the vehicle management system 65 can try to pick up the user. If the remote computing device 12 is simply turned off, then having the vehicle management system 65 try to pick up the user is unnecessary. If the remote computing device 12 is simply turned off, then the vehicle management system 65 can wait until the remote computing device 12 is turned back on to receive pick up instructions from the user.

In some cases, however, the vehicle management system 65 might not be able to distinguish between a remote computing device 12 that has a dead battery and a remote computing device 12 that is simply turned off. If the vehicle management system 65 does not receive a reply to the vehicle management system's attempts to communicate with the remote computing device 12, the vehicle management system 65 may assume the remote computing device 12 is unable to send pick up instructions, and thus, can send the vehicle 2 to try to pick up the user (either right away or later, closer to an estimated pick up time). This approach sometimes leads to unnecessary pick-up attempts (e.g., when the user's remote computing device 12 is simply turned off rather than out of battery power).

To reduce unnecessary pick-up attempts, the vehicle management system 120 can rely on two indicators. The first indicator can include periodically asking the remote computing device 12 for the status of its battery power. The second indicator can include sending a wireless communication 125 to the remote computing device 12. If the remote computing device 12 does not reply to the wireless communication 125, then the vehicle management system 65 can interpret the lack of a reply as the remote computing device 12 no longer being communicatively coupled to the vehicle management system 65.

If the vehicle management system 65 receives data from the remote computing device 12 that indicates the battery power 128 of the remote computing device 12 is below a predetermined threshold (e.g., less than 40% of a full charge, less than 30% of maximum capacity), and then the remote computing device 12 does not reply to a wireless communication 125 from the vehicle management system 65, the vehicle management system 65 can enter a "disabled phone mode" and can send the vehicle 2 to pick up the user at any moment in time, such as immediately, within thirty minutes of determining that the remote computing device 12 did not reply to the wireless communication 125, and/or at a pick-up time that the vehicle management system 65 estimated based on historical behavior of the user or by analyzing the user's calendar (e.g., schedule). Using both the battery status data and the lack of a response from the remote computing device 12 can reduce unnecessary pick-up attempts.

Figure 11:
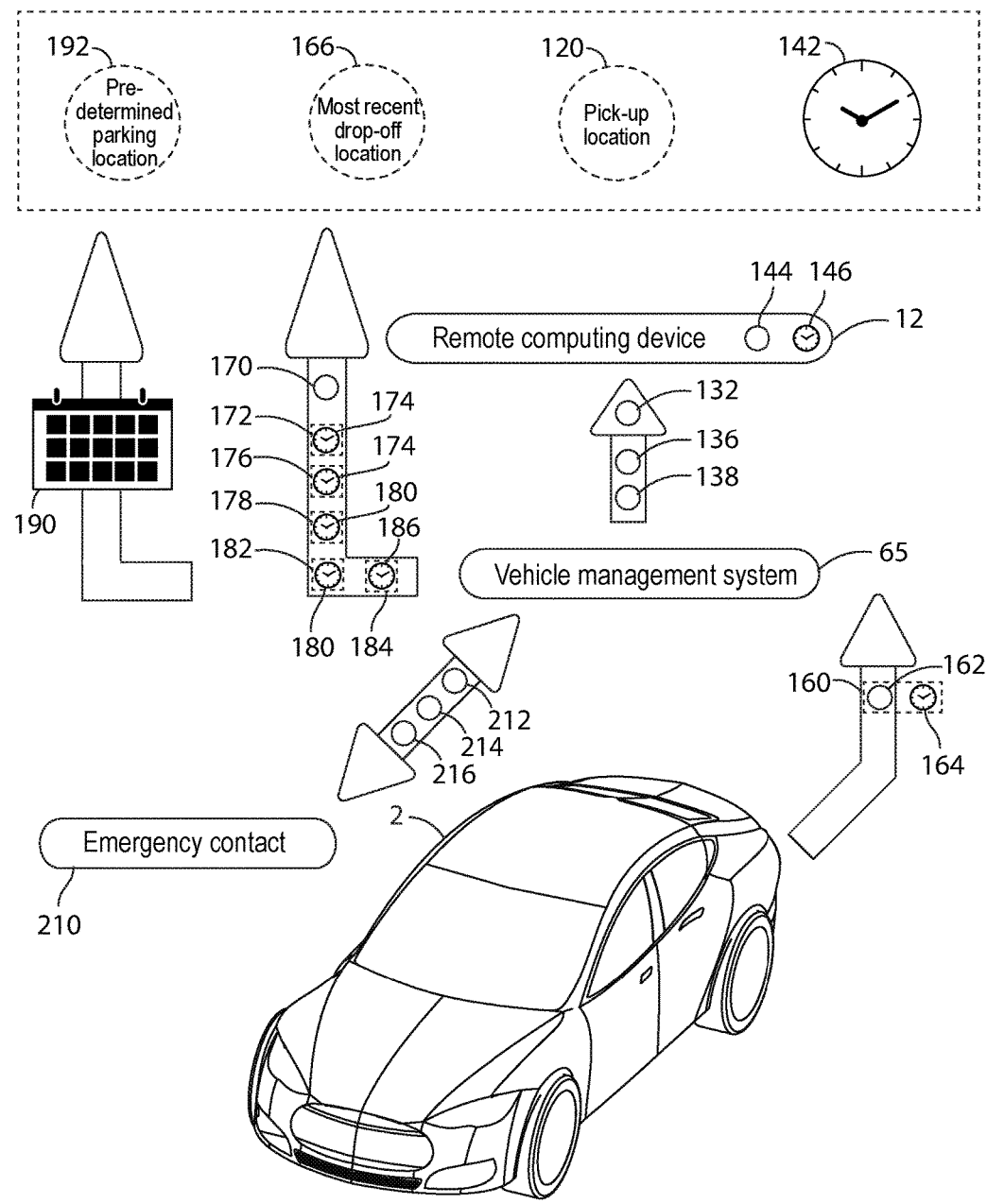
FIG. 11 illustrates a diagrammatic view of another method of using a self-driving vehicle, according to some embodiments.

As shown in FIGS. 10 and 11, methods can further include determining, by the vehicle management system 65, that the remote computing device 12 is no longer communicatively coupled to the vehicle management system 65 in response to determining that the vehicle management system 65 has not received a first wireless communication 132 from the remote computing device 12 for a predetermined amount of time. In some embodiments, the predetermined amount of time is greater than thirty seconds and less than thirty minutes. Furthermore, in some embodiments, the predetermined amount of time can be a time from when the vehicle management system 65 last tried to communicate with the remote computing device 12.

False alarms may still occur, as such, the vehicle management system 65 may be arranged and configured to respond accordingly. For example, if the remote computing device 12 starts communicating with the vehicle management system 65 again (e.g., because the device 12 regained reception or the user charged the device 12), the vehicle 2 may thereby park itself. Stated differently, after sending the self-driving vehicle 2 to the pick-up location 120, the vehicle management system 65 may instruct the self-driving vehicle 2 to find a parking location 134 in response to determining, by the vehicle management system 65, that communicative coupling between the vehicle management system 65 and the remote computing device 12 has been restored.

In some embodiments, the vehicle management system 65 may not initially hear from the remote computing device 12, so the system 65 repeatedly tries to communicate with the device 12 so the system 12 knows when the device 12 regains reception. As shown in FIG. 11, methods may thereby include sending a second wireless communication 136 from the vehicle management system 65 to the remote computing device 12 in response to determining that the remote computing device 12 is no longer communicatively coupled to the vehicle management system 65. The second wireless communication 136 may be configured to elicit a reply wireless communication 138 from the remote computing device 12 to the vehicle management system 65 when the remote computing device 12 regains cellular communication abilities. The system 65 may repeatedly send the second wireless communication 136 until the remote computing device 12 finally receives a response from the remote computing device 12 (e.g., the phone leaves the building that was blocking reception).

Oftentimes, the remote computing device 12 eventually regains reception and re-establishes communication with the vehicle management system 65. Accordingly, and as further shown in FIG. 10, methods may also include sending a second wireless communication 136 from the vehicle management system 65 to the remote computing device 12 in response to determining that the remote computing device 12 is no longer communicatively coupled to the vehicle management system 65. The second wireless communication 136 is configured to elicit a reply wireless communication 138 from the remote computing device 12 to the vehicle management system 65 when the remote computing device 12 regains a connection, such as a cellular communication or Wi-Fi communication. Methods may also include instructing, by the vehicle management system 65, the self-driving vehicle 2 to find a parking location 134 in response to receiving the reply wireless communication 138. It should be appreciated that the parking location 134 can be located remotely relative to the pick-up location 120. In some embodiments, the parking location 134 is the same, or nearly the same, location as the pick-up location 120. In some embodiments, the pick-up location 120 is within fifty yards of the parking location 134 or a drop-off location 140 where the self-driving vehicle 2 last dropped off the user.

The vehicle management system 65 may define various modes so that the self-driving vehicle 2 may pick up the user. For example, the self-driving vehicle 2 may enter an emergency mode when the vehicle management system 65 is unable to communicate with the remote computing device 12. Once communication is re-established, the vehicle 2 may thereby exit emergency mode and park itself, either in the original parking location or in a new parking location. It should be appreciated that when the self-driving vehicle 2 is in the emergency mode, the vehicle management system 65 sends a series of second wireless communications 136 to the remote computing device 12. In other words, in the emergency mode, the vehicle management system 65 sends multiple requests to the remote computing device 12, and then when the vehicle management system 65 does contact the remote computing device 12, the vehicle 2 can repark itself or pick up the user.

The vehicle management system 65 may also be configured to receive a pick-up location 120 and a pick-up time 142 prior to the remote computing device losing communication with the vehicle management system 65. For example, the system 65 may receive the location information 120, 142 at the time a user downloads the software. As such, methods include receiving, by the vehicle management system 65, at least one of the pick-up location 120 and the pick-up time 142 from the remote computing device 12 prior to determining, by the vehicle management system 65, that the remote computing device 12 is no longer communicatively coupled to the vehicle management system 65.

As illustrated in FIG. 11, the vehicle management system 65 may also determine the pick-up location 120 based on location data 144 from the remote computing device 12. Accordingly, methods may include determining, by the vehicle management system 65, the pick-up location 120 by analyzing location data 144 of the remote computing device in a period 146 within a predetermined amount of time (e.g., thirty minutes) of when the vehicle management system 65 determines that the remote computing device 12 is no longer communicatively coupled to the vehicle management system 65. The location data 144 can be GPS data from the remote computing device 12.

Furthermore, methods may include determining, by the vehicle management system 65, a pick-up time 142 based on the location data 144 of the remote computing device 12 during the period 146. For example, the system 65 may determine that the remote computing device 12 is located offshore, in a location unreachable by the vehicle 2. In this regard, the system 65 may predict a time at which the remote computing device 12 will be located in or adjacent to a location where the vehicle 2 is able to drive and thereby pick up the user.

With continued reference to FIG. 11, the system 65 may have access to data regarding past drop-offs and past pick-ups, which can be used to show trends and predict times whereby the user may be located. In this regard, the system 65 may access the user's past schedule, and even the user's current schedule and future schedule to determine where a user may be located. Accordingly, methods may include sending 160, by the vehicle management system 65, the self-driving vehicle 2 to the pick-up location 120 at a time 162 determined, by the vehicle management system 65, based on analyzing past amounts of time 164 from past drop-offs to past pick-ups. Methods may also include sending 160, by the vehicle management system 65, the self-driving vehicle 2 to the pick-up location 120 at a time 162 determined, by the vehicle management system 65, based on analyzing past amounts of time 164 from past drop-offs to past pick-ups at past drop-off locations within a predetermined distance (e.g., fifty yards) of a most recent drop-off location 166. Even still, methods include analyzing location data 144 of the remote computing device 12 after a most recent drop-off 166 of the user, and then sending 160, by the vehicle management system 65, the self-driving vehicle 2 to the pick-up location 120 at a time 162 determined, by the vehicle management system 65, based on analyzing the location data 144. In this regard, the vehicle management system 65 may analyze the user's past amount of time at the drop-off location and/or analyze typical pick times of a day at the drop-off location to estimate a pick-up time 142. The vehicle management system 65 may thereby analyze the user's past amount of time at the last known location of the user (e.g., as requested from the remote computing device 12 of the user) and/or analyze typical pick-up times of day at the last known location of the user to estimate a pick-up time 142. Additionally, methods may include analyzing, by the vehicle management system 65, a schedule 190 of the user to estimate at least one of the pick-up location 120 and a pick-up time 142.

In some embodiments, the self-driving vehicle 2 may travel to the pick-up location 120 but find that the user is not located at the pick-up location 120. As such, the vehicle 2 may leave the pick-up location 120 and then later travel back to the pick-up location 120 at increasing intervals in attempts to pick up the user. For example, the vehicle 2 might travel to the pick-up location 120 to find the user is not there and then come back to the pick-up location 120 in 20 minutes, the next come back time the vehicle 2 might come back 30 minutes later, and the next time the vehicle 2 might come back an hour later. Stated differently, after sending 160 the self-driving vehicle 2 to the pick-up location 120, methods may include determining 170, by the vehicle management system 65, that the user is not located at the pick-up location 120, and instructing 172, by the vehicle management system 65, the self-driving vehicle 2 to move away from the pick-up location 120 and to return to the pick-up location 120 after a first period of time 174. Methods may also include determining 176 that the user is not located at the pick-up location after the first period of time 174, and instructing 178, by the vehicle management system 65, the self-driving vehicle 2 to move away from the pick-up location 120 and to return to the pick-up location 120 after a second period of time 180. Additionally, methods may even include determining 182 that the user is not located at the pick-up location 120 after the second period of time 180, and instructing 184, by the vehicle management system 65, the self-driving vehicle 2 to move away from the pick-up location 120 and to return to the pick-up location 120 after a third period of time 186. In some embodiments, the third period 186 is greater than the second period 180, and the second period 180 is greater than the first period 174. However, in some embodiments, the third period 186 less than the second period 180, and the second period 180 is less than the first period 174. Even still, the first, second, and third periods 174, 180, 186 can all be equal to each other.

In some scenarios, the self-driving vehicle 2 may be unable to locate and/or pick up the user. For example, the user may have taken a different means of transportation to travel to her next destination (e.g., travel back home). Accordingly, the vehicle management system 65 may be arranged and configured to instruct the vehicle 2 to travel to another location, such as the user's residence and/or a location where the car will be safe and easily located by the user at a later time. As such, methods include determining that the user is not located at the pick-up location 120, and instructing, by the vehicle management system 65, the self-driving vehicle 2 to move to a predetermined parking location 192 that is located remotely relative to the pick-up location 120 and a most-recent drop-off location 166.

The predetermined components, such as the predetermined parking location 192, may be received by the vehicle management system 65 at a time prior to the system 65 determining that the remote computing device 12 is no longer communicatively coupled to the system 65. For example, some methods include receiving, by the vehicle management system 65, from the remote computing device 12 the predetermined parking location 192 prior to determining, by the vehicle management system 65, that the remote computing device 12 is no longer communicatively coupled to the vehicle management system 65. In several embodiments, the predetermined parking location 192 is a residence of the user and/or parking spot associated with the user, such as a friend's house, a parking spot at the user's employer, and the like.

As further illustrated in FIG. 11, in some embodiments, the vehicle management system 65 is arranged and configured to notify other people (e.g., an emergency contact and/or a person associated with the user) of various situations involving the self-driving vehicle 2 and/or the user. For example, methods include sending, by the vehicle management system 65, a notification 212 to an emergency contact 210 in response to determining, by the vehicle management system 65, that the remote computing device 12 is no longer communicatively coupled to the vehicle management system 65. In some embodiments, the notification 212 comprises at least one of a most recent drop-off location 166 of the user and any location information of the self-driving vehicle 2. It should be appreciated that the vehicle management system 65 may be arranged and configured to send to the emergency contact 210 any type of notification and/or information regarding the user's last known location, the self-driving vehicle's location, and the like.

Because the user and the emergency contact 210 may have been in contact with each other during the time when the remote computing device 12 and the vehicle management system 65 were not communicatively coupled, the system 65 may be configured to receive information from the emergency contact 210. In some embodiments, methods include receiving from the emergency contact 210, by the vehicle management system 65, at least one of a pick-up time 214 and the pick-up location 216 for the user in response to sending the notification 212. As such, the vehicle management system 65 may be arranged and configured to be communicatively coupled to at least two remote computing devices 12, associated and/or unassociated with the user, so that the system 65 can receive any such information that may help the self-driving vehicle 12 and/or system 65 locate and thereby pick up the user.

The vehicle management system 65 may send notifications and/or communicate with the emergency contact 210 under a variety of circumstances. For example, the vehicle management system 65 might determine the user is not at the pick-up location 120 by sensing that the user did not enter the self-driving vehicle 2. As such, in some embodiments, methods include sending the notification 212 in response to determining, by the vehicle management system 65, that the user is not located at the pick-up location 120. The notification can include a text, a phone call, a text and phone call, and the like to another person associated and/or unassociated with the user.

In some embodiments, the emergency contact 210 is a friend or family member of the user. The emergency contact 210 may even include emergency personnel (e.g., a 911-dispatcher, any personnel associated with law enforcement, roadside service, fire department, and the like). The user may have more than one emergency contact 210. In this regard, the vehicle management system 65 may contact the emergency contacts 210 according to priority. For example, the vehicle management system 65 may contact the user's spouse first and then contact emergency personnel second.

Self-driving vehicles 2 may be used to pick up users in high traffic locations or environments where the vehicle 2 is not allowed to park in one location for long periods of time, such as in front of a mall on Black Friday or in front of a stadium after a game. The vehicle management system 65 may thereby be arranged and configured such that if the user goes to the pick-up location 120, the user may summon the self-driving vehicle 2 to the pick-up location 120 and/or a first location 220 with a smart key 223. The smart key 223 can be a key fob configured to enable unlocking a door of the self-driving vehicle 2. In many embodiments, the smart key 223 is a wireless verification system configured to send an authorization signal to the vehicle 2 so the vehicle 2 knows that the user is authorized to use the vehicle 2. Smart keys 223 are made by many car brands including Lexus, Acura, BMW, and Toyota. In some embodiments, the user may press a button on the smart key 223, or key fob, to summon the self-driving vehicle 2 to the location 120, 220. It should be appreciated that the smart key 223 can be a device that sends a radio wave (e.g., a Bluetooth signal). In some embodiments, the smart key 223 is a second remote computing device 12. Generally, the smart key 223 is a radio communication device that uses Bluetooth and/or any type of wireless transmission to send a signal to the vehicle management system 65 and/or self-driving vehicle 2.

Figure 12:
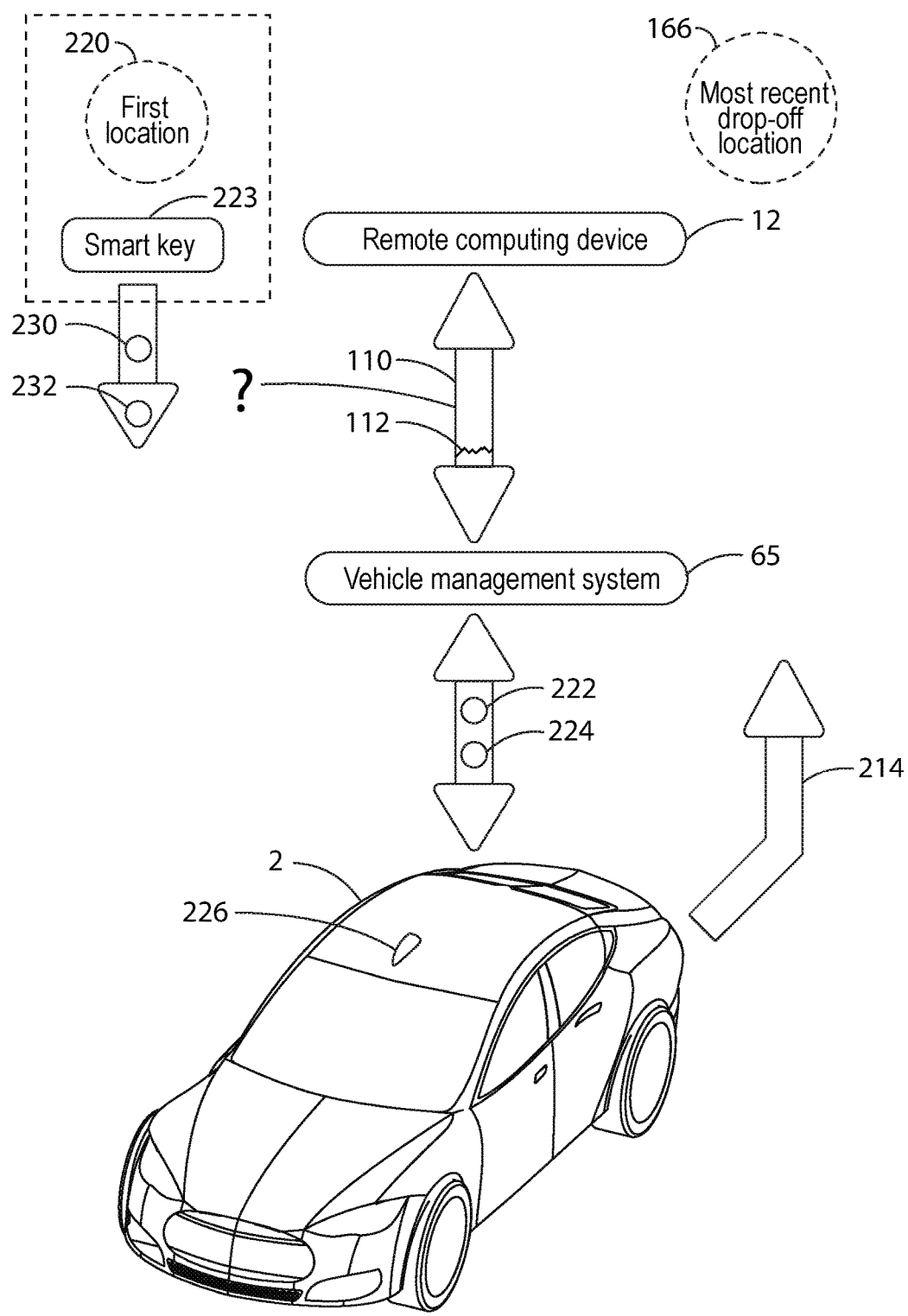
FIG. 12 illustrates a diagrammatic view of another method of using a self-driving vehicle, according to some embodiments.

Accordingly, with reference to FIG. 12, methods include coupling communicatively 210, by the vehicle management system 65, the remote computing device 12 to the self-driving vehicle 2, and then determining 212, by the vehicle management system 65, that the remote computing device 12 is no longer communicatively coupled to the vehicle management system 65. Additionally, methods include identifying, by the vehicle management system 65, a pick-up location 120 of the user. Additionally, methods include sending 214, by the vehicle management system 65, the self-driving vehicle 2 to a first location 220 that is within a direct wireless communication range of a smart key 222 from a most-recent drop-off location 166 in response to determining, by the vehicle management system 65, that the remote computing device 12 is no longer communicatively coupled to the vehicle management system 65. In some embodiments, the sending 214 step comprises sending instructions 222 from the vehicle management system 65 to the self-driving vehicle 2.

In order for the self-driving vehicle 2 and/or vehicle management system 65 to communicate with the smart key 223, the vehicle 2 may thereby include equipment arranged and configured to detect wireless communications from the smart key 223. Accordingly, many methods include receiving, by the vehicle management system 65, an indication 224 that an antenna 226 of the self-driving vehicle 2 detected a first wireless communication 230 from the smart key 223, and then sending 214, by the vehicle management system 65, the self-driving vehicle 2 to the pick-up location 120 in response to receiving the indication 224.

The self-driving vehicle 2 can include multiple directional antennas, each of which is arranged to receive greater power in a specific direction. This way, the vehicle management system 65 can determine which antenna received the greatest signal from the smart key 223, and thereby estimate the direction of the smart key 223 relative to the vehicle 2. The vehicle 2 can then move in the estimated direction and then "listen" for another wireless signal from the smart key 223, which can communicate via radio waves (e.g., Bluetooth). Once the multiple directional antennas receive another wireless communication, the vehicle management system 65 can determine which antenna received the greatest signal from the smart key's latest communication, and thereby estimate the direction of the smart key 223 relative to the vehicle 2. The vehicle 2 can then correct its estimate of the location of the user of the smart key 223. Accordingly, methods include identifying, by the vehicle management system 65, the pick-up location 120 by analyzing a directionality 232 of the first wireless communication from the smart key 223.

In some embodiments, the smart key 223 is an electronic device configured to send radio frequency ("RF") wireless communications directly to an antenna of the vehicle 2. The radio frequency wireless communications can be Bluetooth communications. For example, a user can walk out of a building and then press a button on the smart key 223. Pressing the button on the smart key 223 can cause the smart key 223 to send an RF wireless communication configured to be detected by the vehicle 2 (if the vehicle 2 is within a direct wireless communication range of the smart key 223). The smart key 223 can include an RF antenna configured to send and/or receive RF communications.

Figure 13:
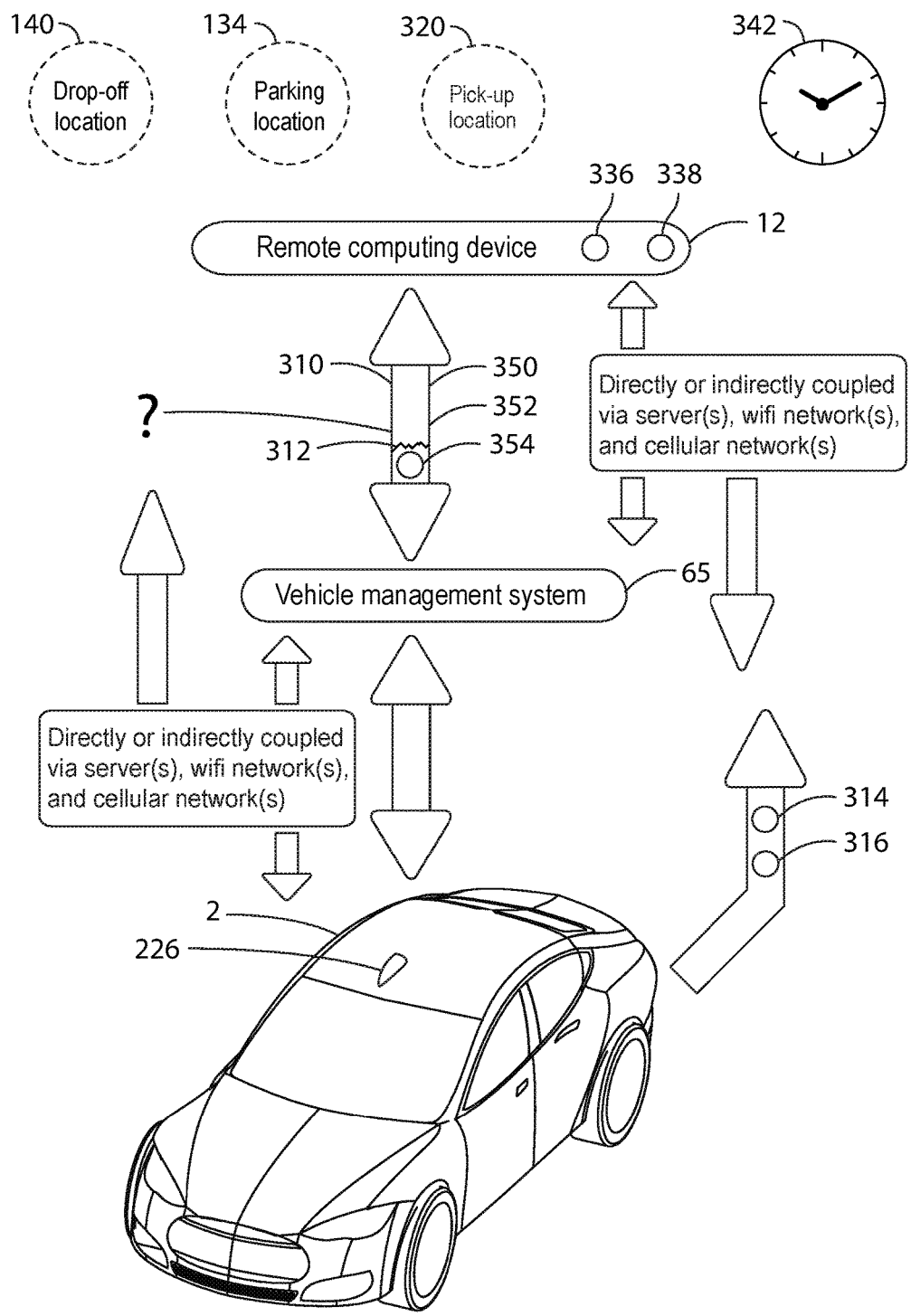
FIG. 13 illustrates a diagrammatic view of another method of using a self-driving vehicle, according to some embodiments.

As shown in FIG. 13, in some embodiments, the remote computing device 12 and/or the vehicle management system 65 detects that the battery 126 of the remote computing device 12 is low. As such, the device 12 and/or system 65 may ask the user for a pick-up location 320 and/or pick-up time 342 prior to the battery 126 dying. Accordingly, methods include coupling communicatively 310, by the vehicle management system 65, the remote computing device 12 to the self-driving vehicle 2 and detecting, by the remote computing device 12, a battery charge indication below a predetermined threshold 336. Methods may thereby include notifying, by the remote computing device 12, the user to select a pick-up time 338 in response to detecting the battery charge indication 128 below the predetermined threshold 130. Additionally, some methods include sending 314, by the vehicle management system 65, the self-driving vehicle 2 to a pick-up location 320 in response to the pick-up time 342 selected by the user.

In some embodiments, the method includes determining 312, by the vehicle management system 65, that the remote computing device 12 is no longer communicatively coupled to the vehicle management system 65, and then sending 316, by the vehicle management system 65, the self-driving vehicle 2 to the pick-up location 320 in response to determining, by the vehicle management system 65, that the remote computing device 12 is no longer communicatively coupled to the vehicle management system 65. In such embodiments, the pick-up time 342 selected by the user may only used if the remote computing device dies. If the remote computing device 12 does not die, then the user can simply select a pick-up time 342 later.

In some embodiments, the vehicle management system 65 is arranged and configured to determine that the remote computing device 12 is not communicatively coupled to the system 65 because the system 65 has not received a wireless communication from the remote computing device 12. Accordingly, methods may also include determining 350, by the vehicle management system 65, that the remote computing device 12 is no longer communicatively coupled to the vehicle management system 65 in response to determining 352 that the vehicle management system 65 has not received a first wireless communication 354 from the remote computing device for a predetermined amount of time.

Figure 14:
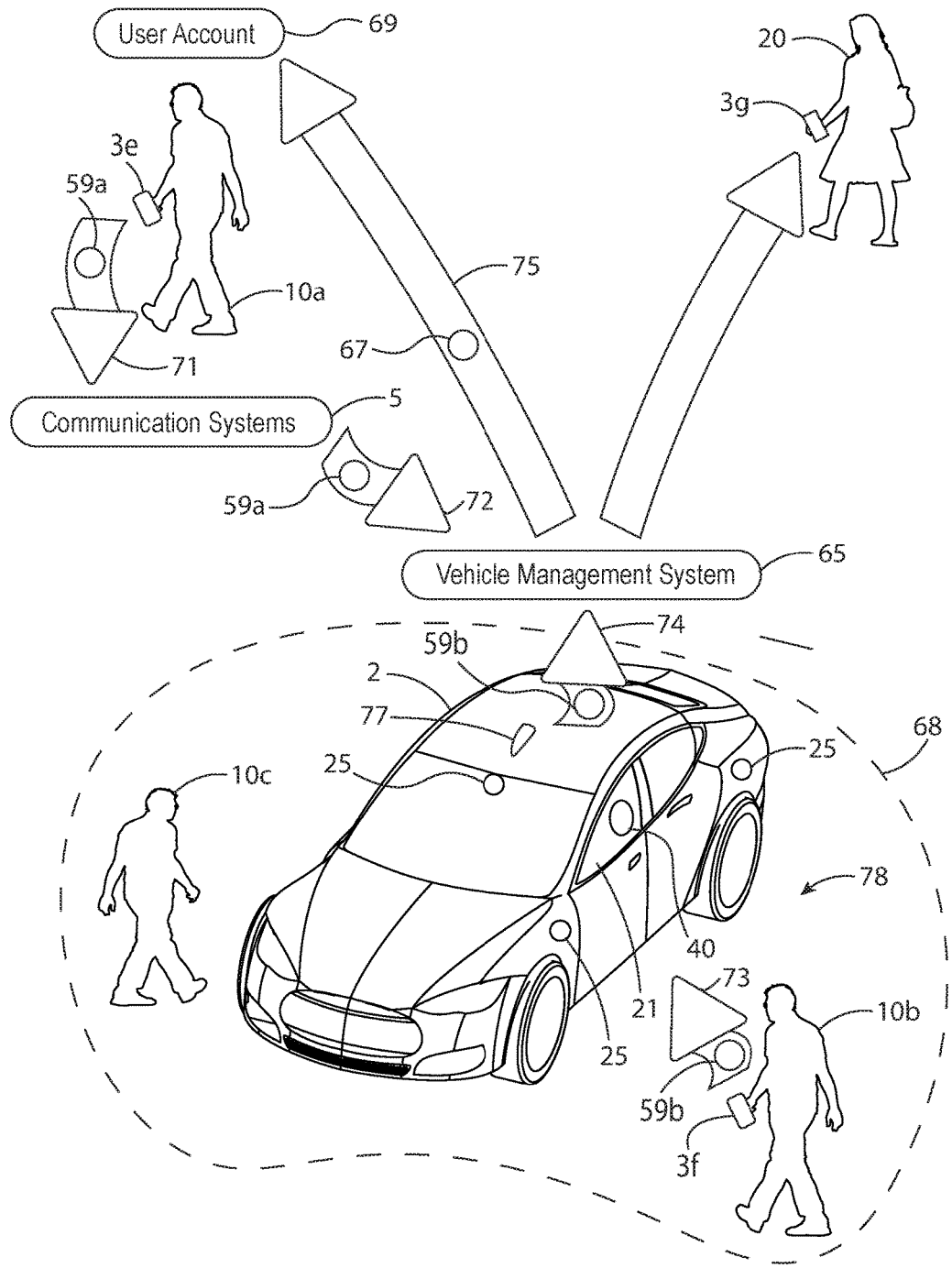
FIG. 14 illustrates a diagrammatic view of another method of using a self-driving vehicle, according to some embodiments.

FIG. 14 illustrates a diagrammatic view of an embodiment that includes a vehicle management system 65 that can be located in the vehicle 2, can be located remotely relative to the vehicle 2, and can be located partially in the vehicle 2 and partially remotely relative to the vehicle 2. FIG. 14 is explained as FIG. 6 in U.S. patent application Ser. No. 15/248,910. The entire contents of U.S. patent application Ser. No. 15/248,910 are incorporated by reference herein. Some embodiments comprise methods of using a vehicle management system to operate a self-driving vehicle. The vehicle management system can be configured to be communicatively coupled with a remote computing device configured to operate software adapted to enable a user to control behaviors of the self-driving vehicle. The software can be an "app" and/or any other suitable software.

The vehicle management system 65 may send notifications and/or communicate with the emergency contact 210 under a variety of circumstances. For example, the vehicle management system 65 might determine that is has lost communication with a remote computing device (e.g., a smartphone, smart key, or other electronic device) of the user of the self-driving vehicle 2. This situation can be very troublesome because, in some cases, the remote computing device is the means by which the user tells the vehicle 2 to pick up the user. In some embodiments, methods include sending a notification in response to determining, by the vehicle management system 65, that the remote computing device is no longer communicatively coupled to the vehicle management system. This notification can include a push notification, a text, a phone call, a text and phone call, and/or any suitable communication to another person who acts as the "emergency contact" of the user.

As used herein, an "emergency contact" can any person or entity to whom the vehicle management system sends the notification when the vehicle 2 has difficulty locating the user (e.g., due to the user not being at the pick-up location, due to a dead or low battery of the remote computing device of the user, due to insufficient wireless communication abilities of the remote computing device of the user, or any other reason). As used herein, the term "emergency" does not require there to be a fire, flood, bodily injury, or the like. Simply having trouble communicating with the user can be an "emergency" as defined herein even if the user is perfectly safe and unaware that she has lost contact with her self-driving vehicle 2.

In some embodiments, the emergency contact 210 is a friend or family member of the user. The emergency contact 210 can also be a call-center worker tasked with helping the user. The emergency contact 210 may even include emergency personnel (e.g., a 911-dispatcher, any personnel associated with law enforcement, roadside service, fire department, and the like). The user may have more than one emergency contact 210. In this regard, the vehicle management system 65 may contact the emergency contacts 210 according to priority. For example, the vehicle management system 65 may contact the user's spouse first and then contact emergency personnel second.

Some embodiments comprise receiving, by the vehicle management system, contact information of an electronic device (e.g., a smartphone, a computer) of the emergency contact (e.g., a person, an entity) in response to the user choosing the emergency contact. In several embodiments, the user chooses the emergency contact via an "app" on her smartphone or a website on a laptop computer, a desktop computer, a tablet computer, or any other suitable computer. The user can also choose the emergency contact(s) by talking to a device such as Amazon Echo. The emergency contact selection system can ask the user to specify the contact information of the person or entity that the user wants to take control of the vehicle 2 in the event that the vehicle management system cannot find the user, cannot communicate with the user, the user is incapacitated (e.g., passed out), etc.

The contact information can include the name, phone number, identification number, username, screen name, address, Skype contact information, Facebook name, etc. configured to enable identifying and/or contacting the emergency contact. For example, the user could select a Facebook profile of the emergency contact, which would enable a system to find contact information of the person or entity associated with the Facebook profile. In some embodiments, the contact information comprises a phone number. The vehicle management system can receive the phone number and then use the phone number to send push notification, text messages, phone calls, etc. to the emergency contact.

The contact information can be configured to enable the vehicle management system to send the notification to the emergency contact in response to the remote computing device no longer being communicatively coupled to the vehicle management system.

The emergency contact can comprise a person that the user chose prior to the vehicle management system determining that the remote computing device is no longer communicatively coupled to the vehicle management system. The emergency contact can comprise the person authorized by the user to send movement instructions to the self-driving vehicle in the event that the vehicle management system is communicatively uncoupled from the remote computing device of the user.

Movement instructions can comprise a pick-up time (e.g., a time to pick up the user), a pick-up location (e.g., a location to pick up the user), and/or an instruction to move the vehicle to a remote location (e.g., go to parking spot, a home base, circle the area until finding the user). Movement instructions can also be more specific steering maneuvers such as turn right here, turn left there, do not hit that car, etc.

The emergency contact can comprise a person that the user chose prior to the vehicle management system determining that the remote computing device is no longer communicatively coupled to the vehicle management system. The emergency contact can comprise the person authorized by the user to send a movement instruction to the self-driving vehicle. Methods can comprise receiving, by the vehicle management system, the movement instruction in response to the notification sent by the vehicle management system to the emergency contact.

In several embodiments, the emergency contact comprises an entity that the user chose prior to the vehicle management system determining that the remote computing device is no longer communicatively coupled to the vehicle management system. The emergency contact can comprise the entity authorized to send movement instructions to the self-driving vehicle in the event that the vehicle management system is communicatively uncoupled from the remote computing device of the user.

In some embodiments, the emergency contact comprises an entity chosen prior to the vehicle management system determining that the remote computing device is no longer communicatively coupled to the vehicle management system. The emergency contact can comprise the entity authorized to send movement instructions to the self-driving vehicle in an event that the vehicle management system is communicatively uncoupled from the remote computing device of the user.

Several embodiments comprise coupling communicatively, by the vehicle management system, the remote computing device to the self-driving vehicle; and sending, by the vehicle management system, a notification to an emergency contact in response to determining, by the vehicle management system, that the remote computing device is no longer communicatively coupled to the vehicle management system.

Several embodiments comprise (in response to sending the notification) receiving from the emergency contact, by the vehicle management system, an instruction to move the vehicle to a remote location, and then instructing, by the vehicle management system, the self-driving vehicle to move to the remote location. The remote location can be a parking spot, the user's home, a pick-up location, etc.

Some embodiments comprise receiving from the emergency contact, by the vehicle management system, a waiting location in response to sending the notification, and then instructing, by the vehicle management system, the self-driving vehicle to move to the waiting location. The vehicle can wait at the waiting location until the vehicle can pick up the user. The waiting location can be located remotely relative to a pick-up location of the user. The waiting location can be a parking garage and the pick-up location can be on a street right outside a store in which the user is shopping.

Some embodiments comprise instructing, by the vehicle management system, the self-driving vehicle to return to a home base in response to determining, by the vehicle management system, that the remote computing device is no longer communicatively coupled to the vehicle management system. The home base can a central storage area (e.g., a parking garage) configured to store vehicles. The home base can also be a garage attached to, near, or inside the user's home.

Several embodiments comprise instructing, by the vehicle management system, the self-driving vehicle to return to a home base in response to determining, by the vehicle management system, that the remote computing device is no longer communicatively coupled to the vehicle management system and in response to determining, by the vehicle management system, that the user is not located at a pick-up location.

Some embodiments comprise instructing, by the vehicle management system, the self-driving vehicle to return to a home base after a predetermined amount of time in response to determining, by the vehicle management system, that the remote computing device is no longer communicatively coupled to the vehicle management system.

Some embodiments comprise instructing, by the vehicle management system, the self-driving vehicle to go to a predetermined pick-up location of the user in response to determining, by the vehicle management system, that the remote computing device is no longer communicatively coupled to the vehicle management system.

Several embodiments comprise instructing, by the vehicle management system, the self-driving vehicle to go to a most recent drop-off location of the user in response to determining, by the vehicle management system, that the remote computing device is no longer communicatively coupled to the vehicle management system.

Some embodiments comprise determining, by the vehicle management system, that the user is not located at the most recent drop-off location, and instructing, by the vehicle management system, the self-driving vehicle to move away from the most recent drop-off location and to return to the most recent drop-off location after a first period of time.

Some embodiments comprise determining, by the vehicle management system, that the user is not located at the most recent drop-off location after the first period of time, and instructing, by the vehicle management system, the self-driving vehicle to move away from the most recent drop-off location and to return to the most recent drop-off location after a second period of time that is greater than the first period of time.

Several embodiments comprise determining that the user is not located at the most recent drop-off location after the second period of time, and instructing, by the vehicle management system, the self-driving vehicle to move away from the most recent drop-off location and to return to the most recent drop-off location after a third period of time that is greater than the second period of time.

In some embodiments, a vehicle management system might lose communicative coupling with a remote computing device, take action in response to losing the communicative coupling (e.g., by trying to pick up the user), and then regain communicative coupling. Once communicative coupling is restored, the vehicle can return to its regular response mode by finding a parking location and waiting for further instructions (e.g., regarding a pick-up time and location).

In some embodiments, (after determining the remote computing device is no longer communicatively coupled to the vehicle management system and instructing, by the vehicle management system, the self-driving vehicle to attempt to pick-up the user) the embodiments comprise instructing, by the vehicle management system, the self-driving vehicle to find a parking location in response to determining, by the vehicle management system, that communicative coupling between the vehicle management system and the remote computing device has been restored.

High-Traffic Embodiments

Social media and other interactive computer-mediated technologies have allowed people in remote locations to determine activity and traffic levels of various places, such as roadways, parking lots, restaurants, museums, concert venues, and the like. For example, a user sitting at home can use social media to see "check in" data at her favorite hangout spot across the city. Accordingly, the "check in" data can be indicative of traffic levels at such places. High "check in" data can signify that many people are coming and going from a specific location, which can indicate that vehicle traffic levels near the establishment are high and the roadways are congested. "Check in" should be broadly interpreted to mean any type of data produced by a respective social media application that indicates a number of visitors at a location at a moment in time.

Self-driving vehicles 2 and/or vehicle management systems 4 will not only have access to this wealth of data, such as "check in" data, but the vehicles 2 and/or systems 4 will be able to make decisions and produce outcomes based on the data. Accordingly, this disclosure includes methods of using a vehicle management system 4 to determine traffic areas and thereby move a self-driving vehicle 2 to a variety of pick-up locations to meet a rider.

In some embodiments the self-driving vehicle 2 and/or vehicle management system 4 is communicatively coupled to a rider's Facebook account. In this regard, the system 4 can retrieve data from Facebook to determine activity at any location. For example, say the rider is wrapping up an unexpectedly long work day in downtown Minneapolis at 9 pm and is expecting to be picked up by the vehicle 2, whereby he will driven to meet an important new client at the airport at 9:30 pm to quickly sign a contract before the client boards a flight. However, unbeknownst to the rider, U2 is playing a night show at Target Field, which is directly across the street from his office, and just one short block away the Minnesota Timberwolves have their home opener at Target Center that same night. Traffic is building and major delays are expected. Unfortunately, because the system 4 has detected a high number of Facebook check-ins at Target Field and Target Center, the system 4 has determined that picking up the rider at his office will result in the rider being late for his 9:30 pm airport meeting. However, the system 4 has calculated that if the vehicle 2 picks the rider up just two blocks away from his office, the rider will arrive at the airport at 9:28 pm. The system 4 thereby sends a wireless communication to the rider's smart phone, whereby the communication includes a request to meet at the proposed location. The rider gladly accepts, via a response wireless communication sent from his smart phone to the system 4. The system 4 has also verified the high activity level, indicated by the Facebook check-ins, by retrieving traffic data from Google Maps and Waze. The system 4 has saved the day.

Additionally, in some embodiments the self-driving vehicle 2 and/or vehicle management system 4 is communicatively coupled to a variety of news outlets, such as ESPN.com and a local news outlet, StarTribune.com, to thereby monitor current events, which may affect roadway conditions and congestion. In this embodiment the system 4 may predict future traffic conditions. Using a similar scenario from the paragraph above, but only this time the rider's work day is ending at 8 pm, and the rider thinks that he has plenty of time to make his earlier 9 pm airport meeting. The time is currently Bpm and based on current roadway conditions, from Google Maps and Waze, the trip is expected to take 28 minutes—again, plenty of time to get to the airport by 9 pm. However, the system 4 determines, via ESPN.com, that the Timberwolves game only has 38 second remaining in the $4^{th}$ quarter, which will be an NBA record for the shortest game ever. Also, the system 4 has retrieved news data from StarTribune.com and determined that the U2 concert, which started at 7 pm is ending at Bpm because Bono tripped over a power cord and broke his leg. The system 4 has determined, via information from the StarTribune.com, that the U2 concert has sold out and the capacity of Target Field is 39,504. Also, the system 4 has determined the Timberwolves game has an attendance of 12,577 that evening. Current traffic conditions don't indicate any delays. However, because of the systems proactive data gathering abilities and access to vast amounts of stored data, which includes years worth of roadway conditions for similar events at similar times, it has determined that based on the crowd of 52,081 people, it will take 1 hour and 4 minutes to get to the rider's office, and another 28 minutes to drive to the airport, which is too late to sign the deal with the new client. Fortunately, the system 4 has calculated that if the rider boards the 8:04 pm eastbound light rail train from the station in front of his office and takes it just 6 short blocks east to the government center stop, then he will be able to meet the vehicle 2 at 8:10 pm. The system 4 further calculates that it will take 26 minutes to drive from the government center to the airport, which will safely get him to the airport for his 9 pm meeting. Similar to the example above, the system 4 sends and receives confirmation to and from the rider. As such, the rider then boards the 8:04 pm train, meets the vehicle at 8:10 pm and then arrives at the airport in time to sign the important contract. Again, the system 4 saves the day.

The self-driving vehicle 2 and/or vehicle management system 4 may also perform the exact same functions, but in this case when the rider is currently aboard the vehicle 2 and be driven to a drop-off location. In this regard, when the disclosure refers to any of the locations as a pick-up location, it can be referring to a pick-up location and/or a drop-off location, such as will be described in the examples below.

To further elaborate on the drop-off scenario, for example, say a rider is traveling, via the vehicle 2, to meet an important new client at a restaurant in downtown Seattle.

However, this time Sting is playing a night show at Target Field, which is directly across the street from the restaurant, and just one short block away the Minnesota Lynx are playing in the WNBA championship at Target Center at the same time. The system 4 has detected a high number of Facebook check-ins at Target Field and Target Center, and has determined that dropping the rider off at the restaurant will result in the rider being late for his 7 pm dinner meeting. However, the system 4 has calculated that if the vehicle 2 drops the rider off just one block away and the rider walks to the restaurant, the rider will arrive at the restaurant at 6:55 pm.

Moreover, in some embodiments the self-driving vehicle 2 and/or vehicle management system 4 is communicatively coupled to a variety of news outlets, like NBCsports.com and CNN.com, which allows the system 4 to predict future roadway conditions. Using a similar scenario in the paragraph above, but only this time the rider is meeting that same new client at 10 pm to quickly sign a contract, whereby time is of the essence. The time is currently 9:30 pm and based on current roadway conditions, from Google Maps and Waze, the trip is expected to take 28 minutes. However, the system 4 determines, via NBCsports.com, that the Lynx game has ended and fans are going wild because the Lynx won another championship. Also, the system 4 has retrieved news data from CNN.com and determined that the Sting concert, which started at 7 pm is likely to end around 9:45 pm. The system 4 has determined, via information from the CNN.com, that the Sting concert has sold out and that the capacity of Target Field is 39,504. Also, the system 4 has determined the Lynx game has an attendance of 14,302 that evening. Again, current traffic conditions don't indicate any of this activity. However, the system 4 has determined that based on the crowd of 53,806 people, it will take 54 minutes to drop the rider at the restaurant—far too late to sign the deal with the new client. Fortunately, the system 4 has calculated that there is time to drop the rider at a light rail station, 4 blocks in the opposite direction of the restaurant. The system 4 sends and receives confirmation to and from the rider's smart phone, which includes instructions for the rider to board the 9:51 pm light rail train headed for Target Field, which will drop the rider at the restaurant at 9:59 pm, just in time to sign the important contract.

Generally, data can be gathered from any variety of sources to determine actual and predicted roadway congestion and traffic levels. In order to retrieve the data, the self-driving vehicle 2 and/or vehicle management system 4 may be communicatively coupled to a host of third-party providers. For example, the vehicle 2 and/or system 4 may be communicatively coupled to social media applications and websites, associated or not with a rider and/or user of the system 4, such as Facebook, Facebook Messenger, Twitter, Instagram, Snapchat, LinkedIn, and the like. In this regard, the vehicle 2 and/or system 4 will be able to access and analyze the data accordingly. Additionally, the vehicle 2 and/or system 4 may be communicatively coupled to other data providers, such as Google, Google maps, Apple, Apple maps, Wave, FitBit, Strava, Skype, WhatsApp, Marco Polo, Fandango, Gametime, YouTube, HomeKit, Spotify, Pandora, Yelp, OpenTable, Lyft, Uber, Amazon, AT&T, T-Mobile, Sprint, Comcast, Verizon, ESPN, Yahoo News, CNN, NFL.com, MLB.com, local news and media outlets, and any other third-party providers of social media data, traffic data, remote computing device data and detection, communication data, WiFi and hotspot data and detection, and the like. Additionally, the vehicle 2 and/or system 4 may be arranged and configured with hardware, as discussed throughout this disclosure, which is capable of detecting remote computing devices, Bluetooth, Zigbee, hot spots, WiFi networks, and the like.

Figure 15A:
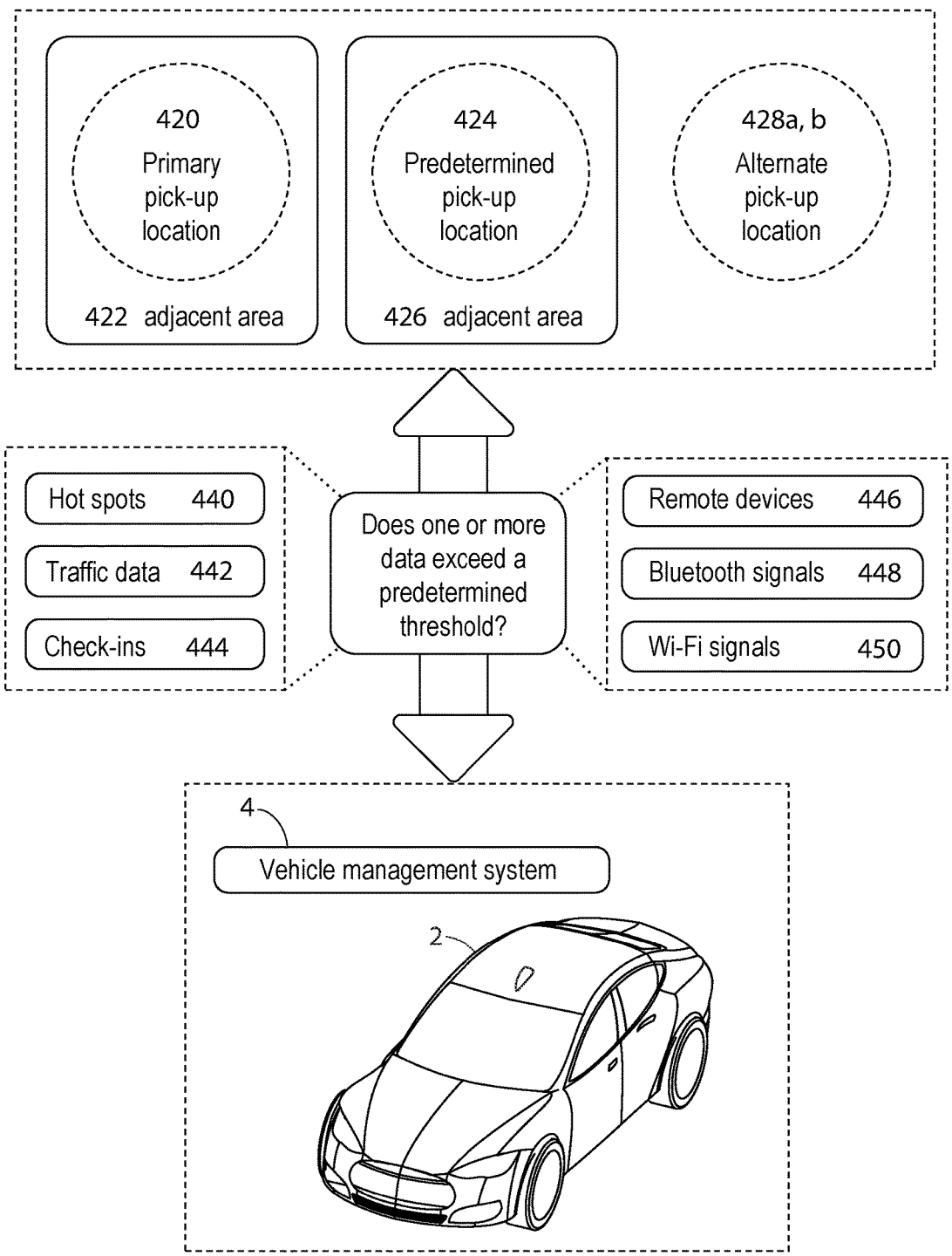
FIGS. 15a and 15b illustrate diagrammatic views of another method of using a self-driving vehicle, according to some embodiments.
Figure 15B:
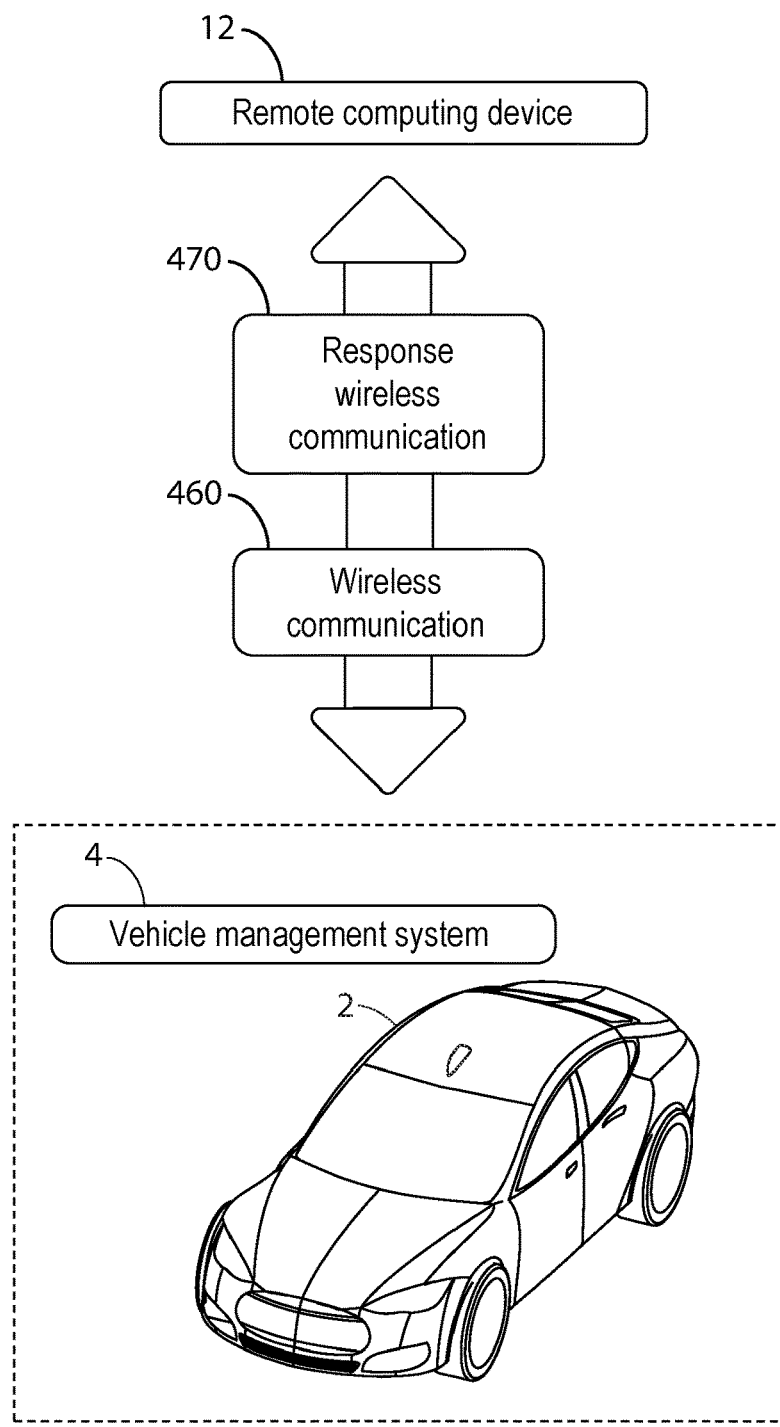
Figure 16:
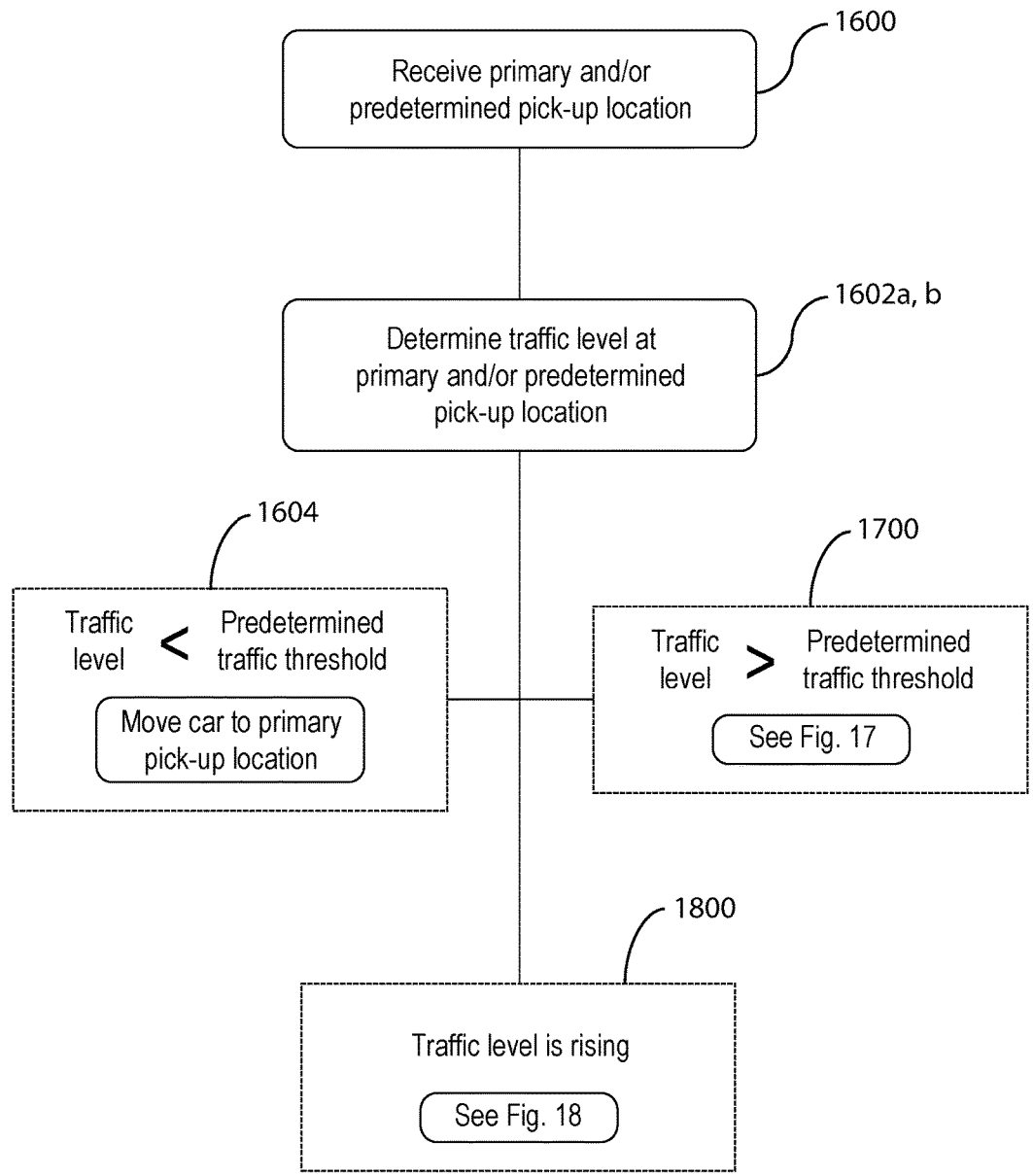
FIG. 16 illustrates a diagrammatic view of another method of using a self-driving vehicle, according to some embodiments.

As shown in FIGS. 15*a*-16, methods may include receiving, by the vehicle management system 4, a primary pick-up location 420 to meet the rider (at step 1600). However, in some embodiments, the system 4 is configured to actually determine the primary pick-up location 420. Generally, the system 4 can be configured to determine and/or receive the primary pick-up location 420 in response to the user entering a location into a remote computing device 12 and/or a console of the vehicle 2. In some embodiments, the system 4 receives the primary pick-up location 420 in response to a software application determining the primary pick-up location 420 based on historical and/or predictive factors, and the like.

In some embodiments, methods of using the vehicle management system will include determining, by the vehicle management system 4, whether traffic adjacent 422 to the primary pick-up location 420 is greater than a predetermined traffic threshold (at step 1602*a*). Accordingly, in response to determining that the traffic adjacent 422 to the primary pick-up location 420 is not greater than the predetermined traffic threshold, methods include sending, by the vehicle management system 4, the self-driving vehicle 2 to the primary pick-up location 420 (at step 1604).

In many embodiments, the step of determining whether traffic adjacent 422 to the primary pick-up location 420 is greater than a predetermined traffic threshold will comprise determining that at least one of a following conditions exist:
- a number of remote computing device hot spots 440 adjacent 422 the primary pick-up location 420 exceeds a predetermined hot spot threshold;
- traffic data 442 collected via wireless communications indicates that traffic adjacent 422 the primary pick-up location 420 exceeds a predetermined traffic data threshold;
- a number of social media check-ins 444 adjacent the primary pick-up location 420 exceeds a predetermined social media check-in threshold;
- a number of remote computing devices 446 adjacent the primary pick-up location 420 exceeds a predetermined remote computing device threshold;
- a number of Bluetooth signals 448 adjacent the primary pick-up location 420 exceeds a predetermined Bluetooth threshold; and
- a number of Wi-Fi signals 450 adjacent the primary pick-up location 420 exceeds a predetermined Wi-Fi threshold.

It should be appreciated that any of the thresholds can be any number that indicates high traffic levels in an adjacent area. For example, the predetermined hot spot threshold may be 50 hot spots, which may indicate that if 50 or more hot spots are detected in an area that high traffic exists in the adjacent area. Furthermore, it should be appreciated that the adjacent area may be the detectable area or radius of a hot spot signal. Generally, the various predetermined thresholds may vary depending on many factors. For example, in congested cities like New York City, the predetermined number of remote computing devices may be 1,000 remote computing devices, while in a small town the predetermined number of remote computing devices may be 10. The vehicle management system 4 may adjust such thresholds based on any factor, such as location, time of day, day of the week, time of year, and the like. Furthermore, while the primary pick-up location 420 is disclosed above, it should be appreciated that the conditions listed above can be determined for any of the pick-up locations 420, 424, 428*a*, 428*b*, and any other pick-up location in this disclosure.

Figure 17:
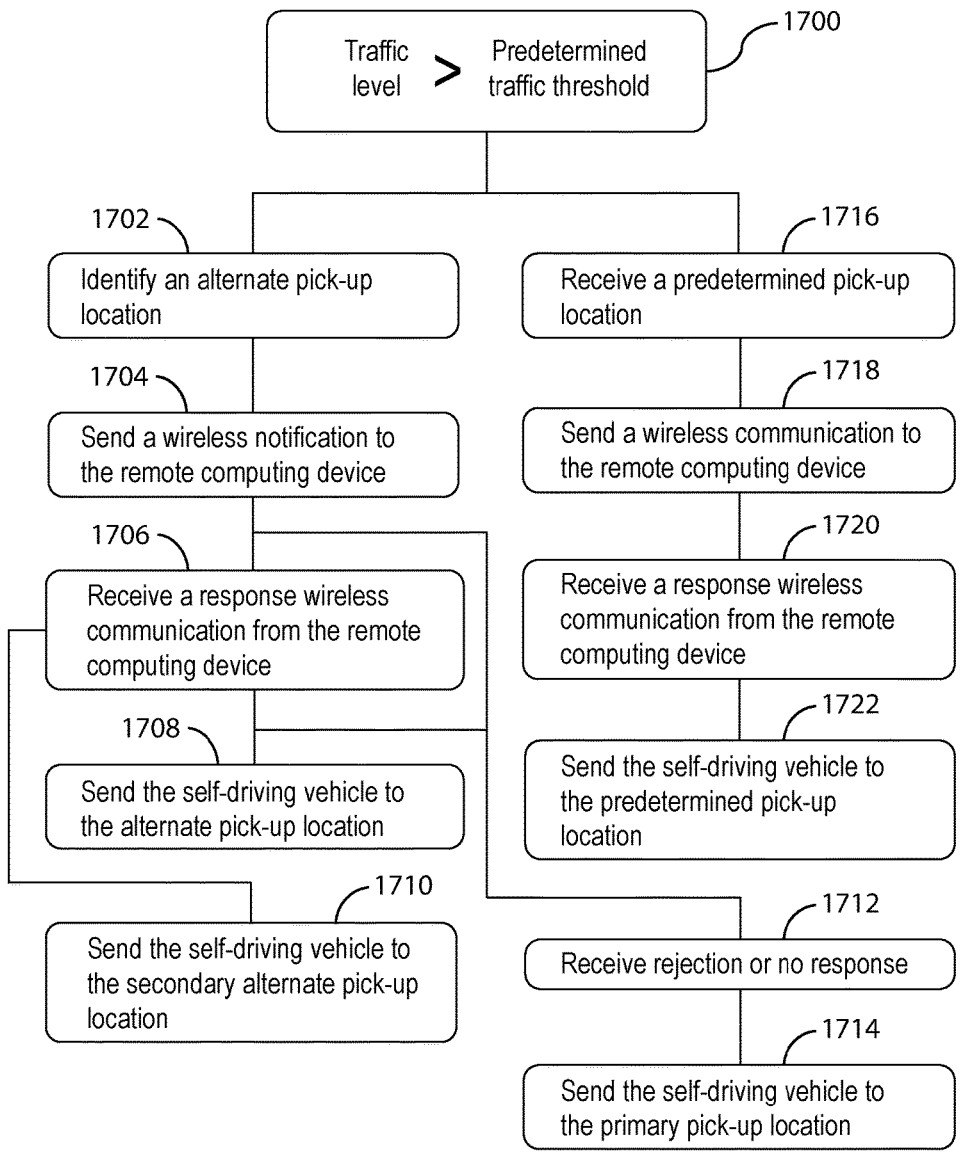
FIG. 17 illustrates a diagrammatic view of another method of using a self-driving vehicle, according to some embodiments.

As shown in FIG. 17, by having access to this data, the self-driving vehicles 2 and vehicle management systems 4 may be arranged and configured to increase efficiency and ease of use for riders. As shown in FIGS. 15*b*-17, in response to determining that traffic adjacent 422 to the primary pick-up location 420 is greater than the predetermined traffic threshold (at step 1700), methods may include identifying, by the vehicle management system 4, an alternate pick-up location 428*a* (at step 1702). It should be appreciated that the alternate pick-up location 428*a* may be a pick-up location that has lower traffic levels (i.e. congestion) than the primary pick-up location 420.

Furthermore, some methods include the step of sending, by the vehicle management system 4, a wireless communication 460 to the remote computing device 12 to request to meet at the alternate pick-up location 428*a* (at step 1704). The wireless communication 460 may be configured to prompt the rider to select the alternate pick-up location 428*a*. Furthermore, it should be appreciated that "identifying an alternate pick-up location 428*a*" can comprise analyzing data (e.g. real-time traffic data) received via the cloud and/or any type of wireless communication.

Likewise, methods may also include receiving, by the vehicle management system 4, a response wireless communication 470 from the remote computing device 12 of the rider (at step 1706). The response wireless communication 470 may comprise a confirmation to meet at the alternate pick-up location 428*a*. Likewise, methods may include sending, by the vehicle management system 4, the self-driving vehicle 2 to the alternate pick-up location 428*a* (at step 1708).

Sometimes, riders may wish to meet the self-driving vehicle 2 at another location, such as a secondary alternate location 428*b*, which is different from the alternate location 428*a*. In such embodiments, the response wireless communication 470 may comprise the secondary alternate pick-up location 428*b*. Accordingly, methods may include sending, by the vehicle management system 4, the self-driving vehicle 2 to the secondary alternate pick-up location 428*b* (at step 1710).

In some situations, riders may be too busy to respond to the vehicle management system's proposed alternate location 428*a*. Even still, the rider may wish to simply reject the alternate pick-up location 428*a* and then not propose a new alternate location, perhaps because they are distracted or don't have the time to respond. Accordingly, in such embodiments, methods include receiving, by the vehicle management system 4, a response wireless communication 470 from the remote computing device 12 or receiving, by the vehicle management system 4, no response from the remote computing device 12 (at step 1712). The response wireless communication 470 may include a rejection to meet at the alternate pick-up location 428*a*. Because the rider has simply rejected the alternate pick-up location 428*a* or provided no secondary alternate pick-up location 428*b*, methods may include sending, by the vehicle management system 4, the self-driving vehicle 2 to the primary pick-up location 420 (at step 1714).

Riders and users of the system may desire to establish preselected or predetermined configurations to thereby assist in using the system. For example, in some embodiments, methods include receiving, by the vehicle management system 4, a predetermined pick-up location 424 to meet the rider (at step 1716). In this regard, the predetermined pick-up location 424 may be selected by the rider as a back-up pick-up location relative to the primary pick-up location 420. Methods may thereby include sending, by the vehicle management system 4, a wireless communication 460 to the remote computing device 12, whereby the wireless communication 460 includes a notification to meet at the predetermined pick-up location 424 (at step 1718). In some embodiments, the method further comprises determining that traffic adjacent 426 to the predetermined pick-up location 424 is greater than the predetermined traffic threshold, at which point, the system 4 may identify and propose a new pick-up location to the rider.

Accordingly, methods may include receiving, by the vehicle management system 4, a response wireless communication 470 from the remote computing device 12 (at step 1720) in which the response wireless communication 470 comprises a confirmation to meet at the predetermined pick-up location 424. Therefore, methods include sending, by the vehicle management system 4, the self-driving vehicle 2 to the predetermined pick-up location 424 (at step 1722). In some embodiments, step 1722 occurs in response to step 1720. Even still, in some embodiments, step 1722 occurs in response to determining, by the vehicle management system 4, that at least one traffic indication regarding the primary pick-up location 420 is greater than a predetermined threshold.

Figure 18:
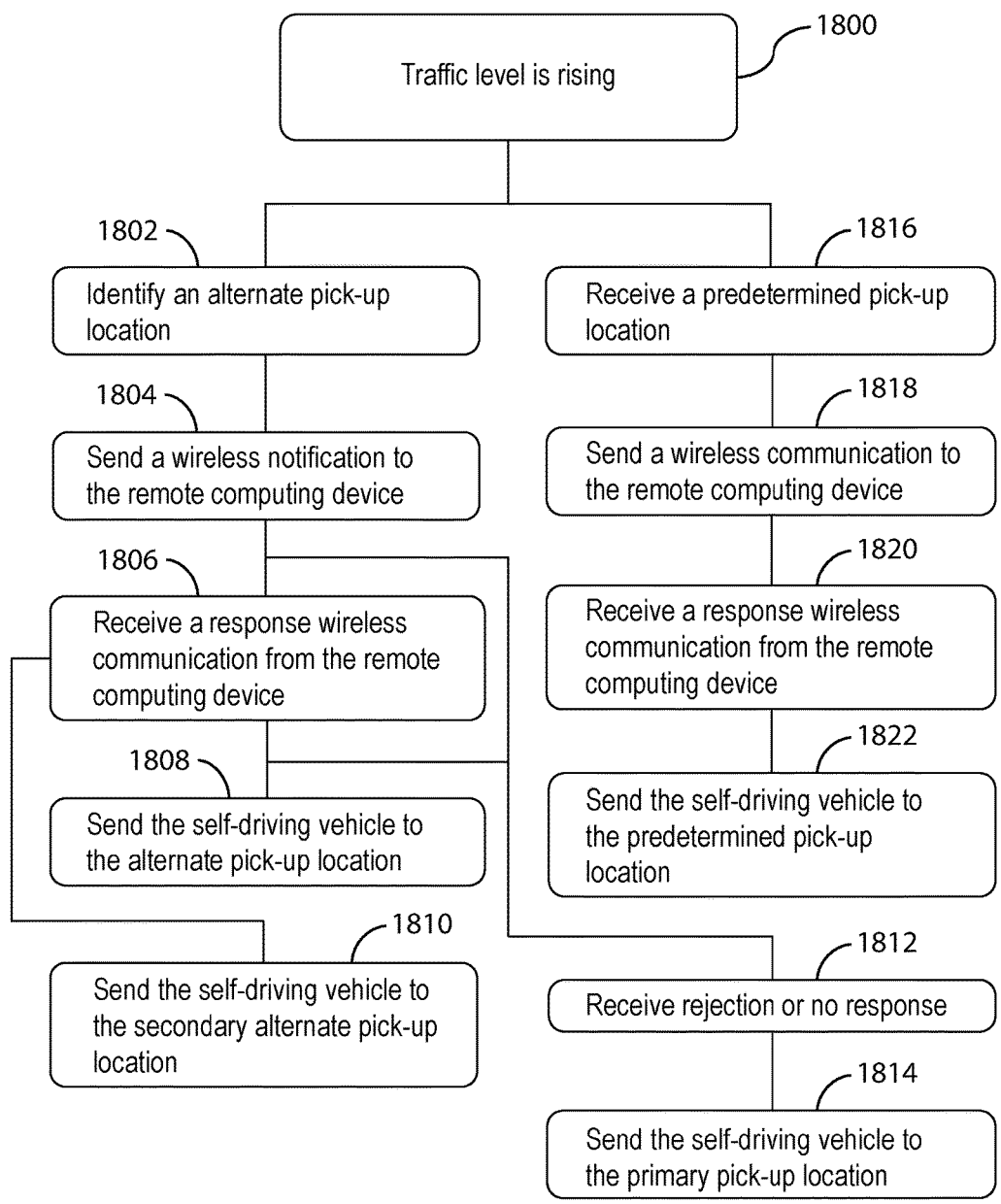
FIG. 18 illustrates a diagrammatic view of another method of using a self-driving vehicle, according to some embodiments.

Now, with reference to FIGS. 16 and 18, the disclosure includes predictive embodiments for determining and reacting to future, or predicted, traffic patterns, which indicate that an area will constitute a high traffic area at any point in the future. In other words, at a future time (e.g. within 30 minutes before or after a pick-up time) the area adjacent to the pick-up location will have traffic greater than a predetermined traffic threshold. Similar to the methods previously disclosed, methods may include the steps of receiving, by the vehicle management system 4, a primary pick-up location 420 to meet the rider (at step 1600) and determining, by the vehicle management system 4, whether traffic adjacent 422 to the primary pick-up location 420 will be greater than a predetermined traffic threshold at a predetermined future time (at step 1602*b*).

In order to determine, or predict, whether traffic adjacent 422 to the primary pick-up location 420 will be greater than a predetermined traffic threshold at the predetermined future time, the vehicle management system 4 may determine that any of the previously disclosed conditions exists. For example, the system 4 may determine that at least one of the following conditions presently exists or will exist within a predetermined amount of time (e.g. 30 minutes) within the predetermined future time and/or the predetermined pick-up time:

a number of remote computing device hot spots 440 adjacent 422 the primary pick-up location 420 exceeds or will exceed a predetermined hot spot threshold;

traffic data 442 collected via wireless communications indicates that traffic adjacent 422 the primary pick-up location 420 exceeds or will exceed a predetermined traffic data threshold;

a number of social media check-ins 444 adjacent 422 the primary pick-up location exceeds or will exceed a predetermined social media check-in threshold;

a number of remote computing devices 446 adjacent 422 the primary pick-up location 420 exceeds or will exceed a predetermined remote computing device threshold;

a number of Bluetooth signals 448 adjacent 422 the primary pick-up location exceeds or will exceed a predetermined Bluetooth threshold; and a number of Wi-Fi signals 450 adjacent 422 the primary pick-up location exceeds or will exceed a predetermined Wi-Fi threshold.

In order to determine if a condition will exist, the vehicle management system 4 and/or any other connected system may process gathered data through any sort of statistical modeling, predictive algorithm, and/or machine-learning algorithm to determine traffic levels at the predetermined future time. Specifically, methods may use clustering algorithms, classification algorithms, regression algorithms, and the like. It will be obvious to a person of ordinary skill in the art what type of modeling or algorithm to employ to determine future traffic conditions.

As illustrated in FIG. 18, in response to determining that the traffic adjacent 422 to the primary pick-up location 420 will be greater than the predetermined traffic threshold (at step 1800), methods may include identifying, by the vehicle management system 4, an alternate pick-up location 428a (at step 1802). It should be appreciated that the system 4 may determine that the alternate pick-up location 428a,b may be less than the predetermined traffic threshold.

Methods may thereby include sending, by the vehicle management system 4, a wireless communication 460 to the remote computing device 12 (at step 1804). The wireless communication 460 may include a request for the rider to meet the self-driving vehicle 2 at the alternate pick-up location 428a. As expected, in some embodiments, the method includes receiving, by the vehicle management system 4, a response wireless communication 470 from the remote computing device 12 (at step 1806). The response wireless communication 470 may include a confirmation to meet at the alternate pick-up location 428a. Likewise, methods may include sending, by the vehicle management system 4, the self-driving vehicle 2 to the alternate pick-up location 428a (at step 1808).

At times, riders may wish to meet the self-driving vehicle 2 at a different location, such as a secondary alternate location 428b that is different from the alternate location 428a. In such embodiments, the response wireless communication 470 may comprise the secondary alternate pick-up location 428b. Accordingly, methods may include sending, by the vehicle management system 4, the self-driving vehicle 2 to the secondary alternate pick-up location 428b (at step 1810).

Similar to what was previously disclosed, users and riders may be in situations where they are too busy to respond to the vehicle management system's proposed alternate location 428a. Also, riders may choose to simply reject the alternate pick-up location 428a and then not propose a new alternate location. As such, methods include receiving, by the vehicle management system 4, a response wireless communication 470 from the remote computing device 12 or receiving, by the vehicle management system 4, no response from the remote computing device 12 (at step 1812). The response wireless communication 470 may include a rejection to meet at the alternate pick-up location 428a. Since the rider has rejected the alternate pick-up location 428a and/or provided no secondary alternate pick-up location 428b, methods include sending, by the vehicle management system 4, the self-driving vehicle 2 to the primary pick-up location 420 (at step 1814) in an attempt to meet the rider.

Again, system users may desire to preset various configurations to thereby assist in using the system. Accordingly, in some embodiments, methods include receiving, by the vehicle management system 4, a predetermined pick-up location 424 to meet the rider (at step 1816). In this regard, the predetermined pick-up location 424 may be selected by the rider as a back-up pick-up location relative to the primary pick-up location 420. Methods may also include sending, by the vehicle management system 4, a wireless communication 460 to the remote computing device 12, whereby the wireless communication 460 includes a notification to meet at the predetermined pick-up location 424 (at step 1818).

Accordingly, methods may include receiving, by the vehicle management system 4, a response wireless communication 470 from the remote computing device 12 (at step 1820) in which the response wireless communication 470 comprises a confirmation to meet at the predetermined pick-up location 424. Therefore, methods include sending, by the vehicle management system 4, the self-driving vehicle 2 to the predetermined pick-up location 424 (at step 1822). In some embodiments, step 1822 occurs in response to step 1820. Even still, in some embodiments, step 1822 occurs in response to determining, by the vehicle management system 4, that at least one traffic indication regarding the primary pick-up location 420 is greater than a predetermined threshold.

Figure 19:
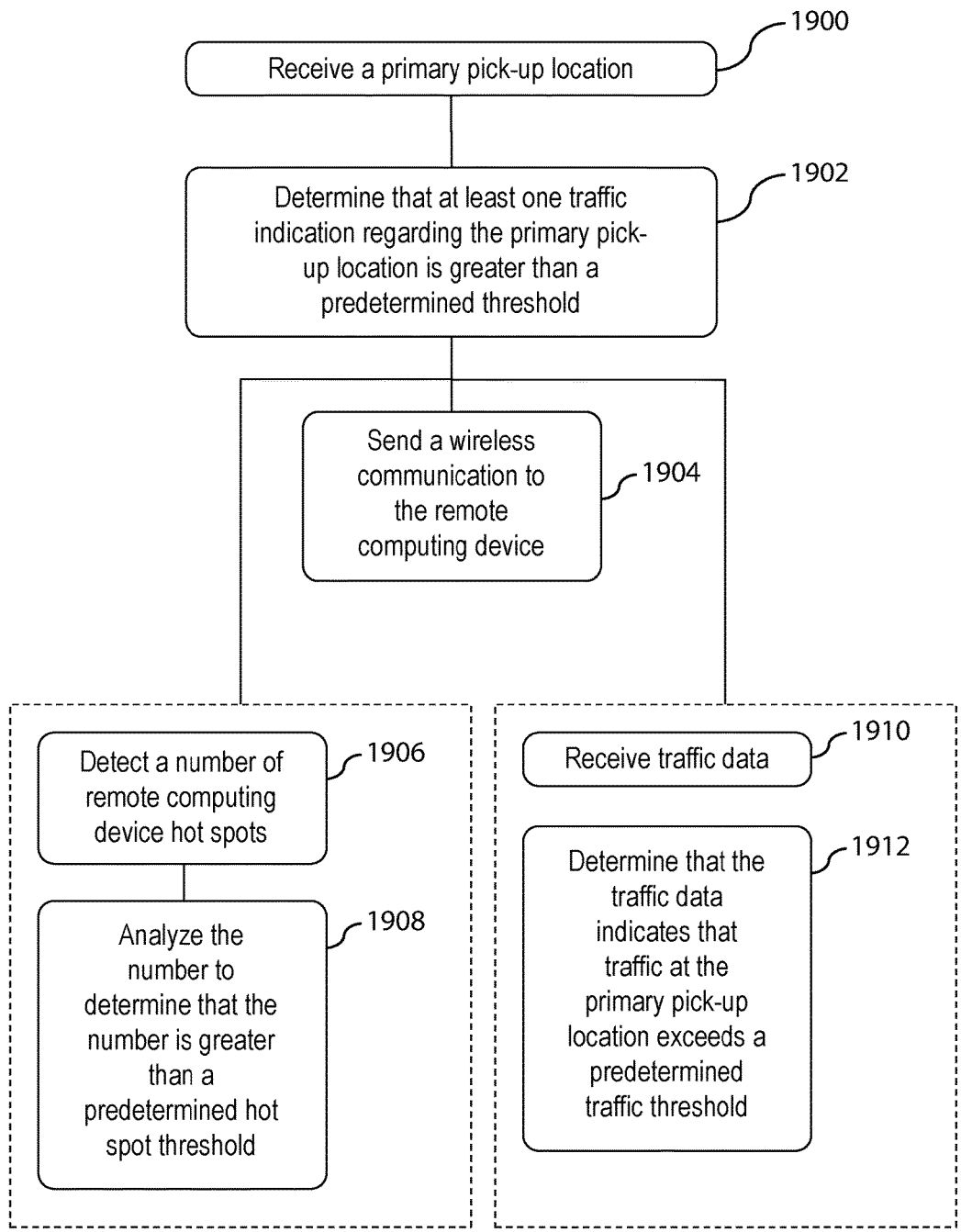
FIG. 19 illustrates a diagrammatic view of another method of using a self-driving vehicle, according to some embodiments.

As illustrated in FIG. 19, the disclosure also includes receiving, by the vehicle management system 4, a primary pick-up location 420 to meet the rider (at step 1900) and determining, by the vehicle management system 4, that at least one traffic indication regarding the primary pick-up location 420 is greater than a predetermined threshold (at step 1902).

In response to determining, by the vehicle management system 4, that the at least one traffic indication regarding the primary pick-up location 420 is greater than the predetermined threshold, methods further include sending, by the vehicle management system 4, a wireless communication 460 to the remote computing device 12 (at step 1904). The wireless communication 460 may be configured to prompt the rider to select an alternate pick-up location 428.

The step of determining that at least one traffic indication regarding the primary pick-up location is greater than a predetermined threshold may comprise a variety of different steps in various sequences. In some embodiments, the determining step 1902 comprises detecting, by an antenna of the self-driving vehicle 2, a number of remote computing device hot spots 440 (at step 1906), and then analyzing, by the vehicle management system 4, the number to determine that the number is greater than a predetermined hot spot threshold (at step 1908). While, in some embodiments the determining step 1902 includes receiving, by the vehicle management system 4, traffic data collected via wireless communications, (at step 1910) and then determining, by the vehicle management system 4, that the traffic data indicates that traffic at the primary pick-up location 420 exceeds a predetermined traffic threshold (at step 1912). The traffic data can be collected by a third party such as Google, Apple, and the like. These third parties can track remote computing devices located in millions of cars to provide traffic data. Wireless communications from the remote computing devices in the millions of cars can provide car location information to the third party.

Figure 20:
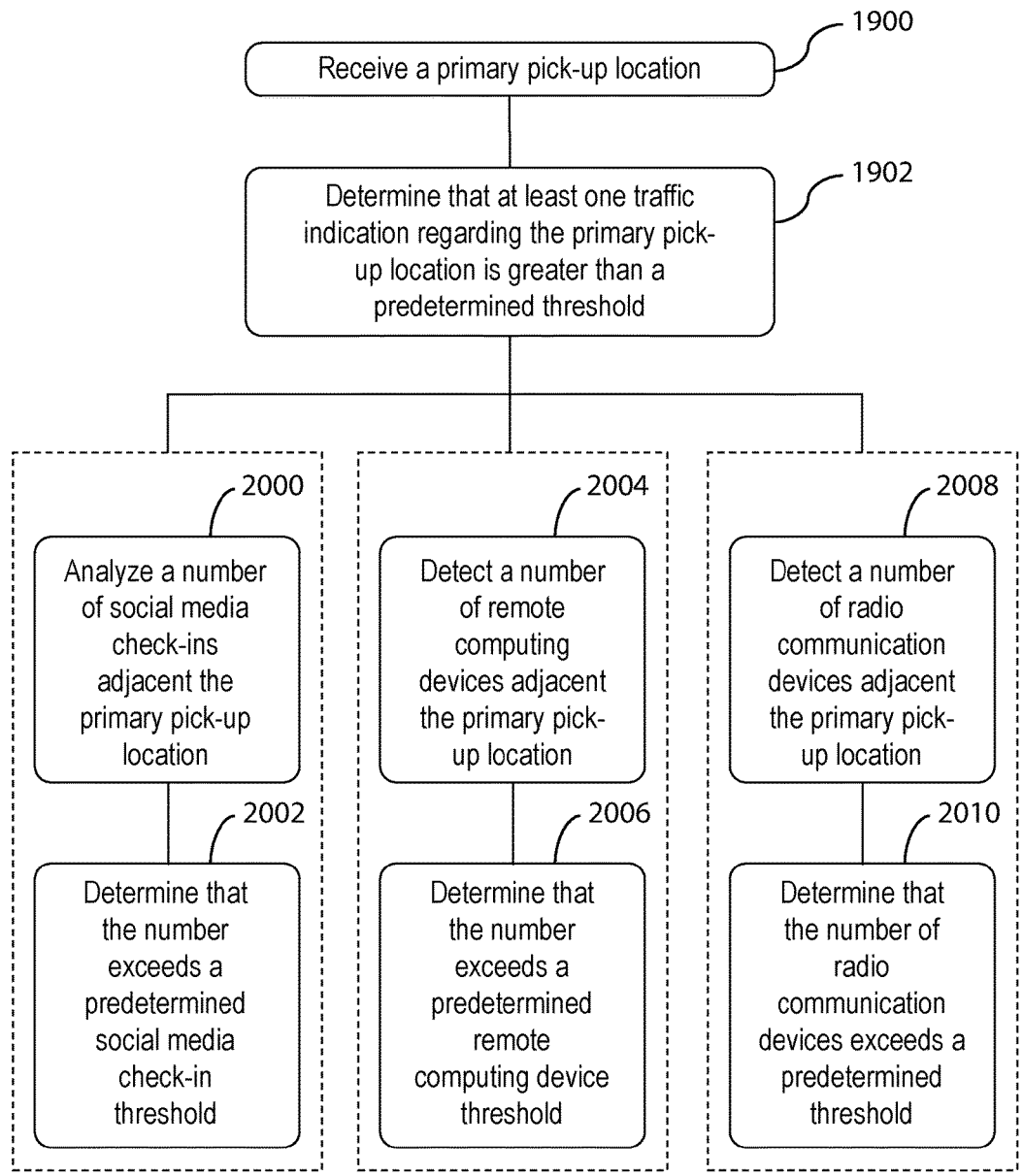
FIG. 20 illustrates a diagrammatic view of another method of using a self-driving vehicle, according to some embodiments.

As shown in FIG. 20, in some embodiments, the determining step 1902 comprises analyzing, by the vehicle management system 4, a number of social media check-ins 444 adjacent 422 the primary pick-up location 420 (at step 2000), and then determining that the number exceeds a predetermined social media check-in threshold (at step 2002). It should be appreciated that many social media check-ins 444 can indicate that the pick up location 420 is too crowded and that traffic levels in the area adjacent 422 the primary pick-up location 420 is too congested.

As well, in some embodiments, the determining step 1902 comprises detecting, by an antenna of the self-driving vehicle 2, a number of remote computing devices adjacent 422 the primary pick-up location 420 (at step 2004), and then determining, by the vehicle management system 4, that the number exceeds a predetermined remote computing device threshold (at step 2006). It should be appreciated that too many remote computing devices can indicate that the primary pick-up location 420 is too crowded, and hence, the vehicle management system 4 may find a new location to meet the rider.

Finally, in some embodiments, the determining step 1902 comprises detecting, by an antenna of the self-driving vehicle 2, a number of radio communication devices adjacent 422 the primary pick-up location 420 (at step 2008), and then determining, by the vehicle management system 4, that the number of radio communication devices exceeds a predetermined threshold (at step 2010). The radio communication devices can be detected by using an antenna, of the vehicle 2, to detect Bluetooth signals, wireless communication signals with a frequency between 2 MHz and 3.5 MHz, WiFi signals, wireless communication signals with a frequency between 2.4 MHz and 5 MHz, and/or wireless communication signals with a frequency between 1.5 MHz and 7.5 MHz.

Interpretation

The self-driving vehicle can be any suitable vehicle. For example, the self-driving vehicle 2 can be a Tesla Model S made by Tesla, Inc. The Tesla Model S can include the Enhanced Autopilot package and the Full Self-Driving Capability package. The Full Self-Driving Capability package includes eight active cameras to enable full self-driving in almost all circumstances.

The self-driving vehicle 2 can also be a Waymo car. Waymo was formerly the Google self-driving car project. Waymo, which is owned by Alphabet Inc., has logged thousands of self-driving miles over many years. Waymo vehicles have sensors and software that are designed to detect pedestrians, cyclists, vehicles, roadwork and more from a distance of up to two football fields away in all directions. Waymo has stated that its software leverages over four million miles of real world driving data. In some embodiments, self-driving vehicles sometimes drive themselves, sometimes are driven remotely by a computing system, and sometimes are driven manually by a human turning a steering wheel, operating pedals, and performing other driver functions. In several embodiments, a self-driving vehicle drives without a human inside the vehicle to pick up the human and then lets the human drive the vehicle. Although in some cases, the human may choose not to drive the vehicle and instead may allow the vehicle to drive (e.g., steer and control speed) itself (e.g., in response to a destination requested by the human).

The remote computing device 12 can be a smartphone, a tablet computer, a laptop computer, a desktop computer, a server, and/or any type of computer that is located remotely relative to the vehicle. In some embodiments, the remote computing device 12 is an iPhone made by Apple Inc. or an Android phone based on software made by Alphabet Inc. The remote computing device 12 can comprise a speaker configured to emit sounds, a microphone configured to record sounds, and a display screen configured to display images.

In some embodiments, portions of the vehicle management system 65 can be physically coupled to the self-driving vehicle 2 while other others of the vehicle management system 65 are not physically coupled to the vehicle 2 and are located remotely relative to the vehicle 2.

In some embodiments, at least a portion of the vehicle management system 65 is located in the vehicle 2. In several embodiments, at least a portion of the vehicle management system 65 is located remotely relative to the vehicle 2. The vehicle management system 65 can comprise many servers, computers, and vehicles. The vehicle management system 65 can comprise cloud computing and cloud storage.

In several embodiments, the entire vehicle management system 65 is located in the self-driving vehicle 2. The vehicle 2 can comprise the vehicle management system 65. In some embodiments, a first portion of the vehicle management system 65 is physically coupled to the vehicle 2, and a second portion of the vehicle management system 65 is not physically coupled to the vehicle 2. The second portion can be located remotely relative to the vehicle 2. In several embodiments, the entire vehicle management system 65 is located remotely relative to the vehicle 2.

The phrase "communicatively coupling" can include any type of direct and/or indirect coupling between the self-driving vehicle 2, remote computing device 12, and vehicle management system 65. For example, the remote computing device 12 can be communicatively coupled to the vehicle management system 65 via servers, Wi-Fi networks, and cellular networks can also be part of this coupling.

In some embodiments, one or more of the pick-up location 120, parking location 134, drop-off location 140, most recent drop-off location 166, pre-determined drop-off location 192, first pick-up location 220, and/or the pick-up location 320 are in the same location. In some embodiments, one or more of the pick-up location 120, parking location 134, drop-off location 140, most recent drop-off location 166, pre-determined drop-off location 192, first pick-up location 220, and/or the pick-up location 320 are in different locations.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The term "app", as used in this disclosure, refers to both native apps and mobile cloud apps (and Web apps). Native apps are installed directly on remote computing devices, whereby developers create separate app versions for each type of remote computing device (e.g., iPhone devices and Android devices). Native apps may be stored on the remote computing device out of the box, or the native apps can be downloaded from a public or private app store and installed on the remote computing device. Self-driving vehicle data associated with native apps can also stored on the remote computing device, although data can be stored remotely and accessed by the native app. Depending on the nature of the native app, Internet connectivity may not be required.

Mobile cloud apps are very similar to Web-based apps. The main similarity is that both mobile cloud apps and Web apps run on servers external to the remote computing device and may require the use of a browser on the remote computing device to display and then use the app user interface (UI). Mobile cloud apps can be native apps rebuilt to run in the mobile cloud; custom apps developed for mobile devices; or third-party apps downloaded to the cloud from external sources. Some organizations offer both a native and mobile cloud versions of their applications. In short, the term "app" refers to both native apps and mobile cloud apps.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method of using a vehicle management system to identify a high traffic area and move a self-driving vehicle to meet a rider, wherein the vehicle management system is configured to be communicatively coupled with a remote computing device associated with the rider, the method comprising:

receiving, by at least one of the vehicle management system and the remote computing device, a primary pick-up location to meet the rider;

determining, by at least one of the vehicle management system and the remote computing device, that traffic adjacent to the primary pick-up location is greater than a predetermined traffic threshold; and in response to the determining, instructing, by at least one of the vehicle management system and the remote computing device, the self-driving vehicle to pick up the rider at a secondary pick-up location.

2. The method of claim 1, further comprising determining, by at least one of the vehicle management system and the remote computing device, that traffic adjacent to the secondary pick-up location is greater than a second predetermined traffic threshold.

3. The method of claim 1, further comprising receiving, by at least one of the vehicle management system and the remote computing device, an input that represents the predetermined traffic threshold.

4. The method of claim 1, further comprising receiving, by at least one of the vehicle management system and the remote computing device, the secondary pick-up location to meet the rider.

5. The method of claim 1, further comprising receiving, by at least one of the vehicle management system and the remote computing device, traffic data from a third party data provider.

6. The method of claim 1, further comprising determining, by the vehicle management system, the primary pick-up location at least partially in response to historical data associated with the rider.

7. The method of claim 1, further comprising in response to the determining, instructing, by at least one of the vehicle management system and the remote computing device, the self-driving vehicle to move away from the primary pick-up location.

8. The method of claim 1, further comprising in response to the determining, instructing, by at least one of the vehicle management system and the remote computing device, the self-driving vehicle to move towards a location of the remote computing device.

9. The method of claim 1, wherein the determining comprises detecting, by an antenna of the self-driving vehicle, a number of remote computing devices adjacent the primary pick-up location, and estimating, by the vehicle management system, that the number of remote computing devices exceeds a predetermined threshold.

10. The method of claim 1, wherein the determining comprises determining, by at least one of the vehicle management system and an antenna of the self-driving vehicle, that a number of remote computing device hot spots adjacent the primary pick-up location exceeds a predetermined hot spot threshold.

11. The method of claim 1, wherein the determining comprises determining, by at least one of the vehicle management system and an antenna of the self-driving vehicle, that traffic data collected via at least one wireless communication indicates that the traffic adjacent the primary pick-up location exceeds a predetermined traffic data threshold.

12. The method of claim 1, wherein the determining comprises determining, by at least one of the vehicle management system and an antenna of the self-driving vehicle, that a number of social media check-ins adjacent the primary pick-up location exceeds a predetermined social media check-in threshold.

13. The method of claim 1, wherein the determining comprises determining, by the vehicle management system, that a number of remote computing devices adjacent the primary pick-up location exceeds a predetermined remote computing device threshold.

14. The method of claim 1, wherein the determining comprises determining, by at least one of the vehicle management system and an antenna of the self-driving vehicle, that a number of Bluetooth signals adjacent the primary pick-up location exceeds a predetermined Bluetooth threshold.

15. The method of claim 1, wherein the determining comprises determining, by an antenna of the self-driving vehicle, that a number of Wi-Fi signals adjacent the primary pick-up location exceeds a predetermined Wi-Fi threshold.

16. The method of claim 1, further comprising in response to the determining, sending, by the vehicle management system, a wireless communication to the remote computing device, wherein the wireless communication is configured to prompt the rider to select the secondary pick-up location.

17. The method of claim 16, further comprising in response to sending the wireless communication, receiving, by the vehicle management system, a response wireless communication from the remote computing device, wherein the response wireless communication comprises a confirmation to meet at the secondary pick-up location.

18. The method of claim 16, further comprising in response to sending the wireless communication, receiving, by the vehicle management system, a response wireless communication from the remote computing device, wherein the response wireless communication comprises a tertiary pick-up location.

19. The method of claim 18, further comprising instructing, by at least one of the vehicle management system and the remote computing device, the self-driving vehicle to pick up the rider at the tertiary pick-up location.

20. The method of claim 16, further comprising in response to sending the wireless communication, receiving, by the vehicle management system, a response wireless communication from the remote computing device, wherein the response wireless communication comprises a rejection to meet at the secondary pick-up location.

21. The method of claim 20, further comprising:
receiving, by the vehicle management system, a second response wireless communication from the remote computing device, wherein the second response wireless communication comprises instructions to meet at the primary pick-up location; and
instructing, by at least one of the vehicle management system and the remote computing device, the self-driving vehicle to pick up the rider at the primary pick-up location.

22. The method of claim 20, further comprising receiving, by the vehicle management system, a secondary response wireless communication from the remote computing device, wherein the secondary response wireless communication comprises a tertiary pick-up location.

23. The method of claim 22, further comprising instructing, by at least one of the vehicle management system and the remote computing device, the self-driving vehicle to pick up the rider at the tertiary pick-up location.

24. The method of claim 1, further comprising identifying, by the vehicle management system, the secondary pick-up location.

25. The method of claim 24, further comprising in response to the determining, sending, by the vehicle management system, a wireless communication to the remote computing device, wherein the wireless communication comprises a request to meet at the secondary pick-up location.

26. The method of claim 1, further comprising receiving, by the vehicle management system, a predetermined pick-up location to meet the rider, wherein the predetermined pick-up location is selected by the rider as a back-up pick-up location relative to the primary pick-up location.

27. The method of claim 26, further comprising in response to the determining, sending, by the vehicle management system, a wireless communication to the remote computing device, wherein the wireless communication comprises a notification to meet at the predetermined pick-up location.

28. The method of claim 27, further comprising receiving, by the vehicle management system, a response wireless communication from the remote computing device, wherein the response wireless communication comprises a confirmation to meet at the predetermined pick-up location.

29. The method of claim 28, further comprising instructing, by at least one of the vehicle management system and the remote computing device, the self-driving vehicle to pick up the rider at the predetermined pick-up location.

\* \* \* \* \*